(12) United States Patent
Goethlich et al.

(10) Patent No.: US 8,420,174 B2
(45) Date of Patent: Apr. 16, 2013

(54) POLYMER COMPOSITION FOR CORROSION PROTECTION

(75) Inventors: Alexander Goethlich, Mannheim (DE); Frank Klippel, Ludwigshafen (DE); Gunnar Schornick, Neuleiningen (DE); Guido Vandermeulen, Ilvesheim (DE); Helmut Witteler, Wachenheim (DE); Thomas Heidenfelder, Dannstadt-Schauernheim (DE); Markus Hickl, Muenster (DE); Michael Dornbusch, Muenster (DE); Konrad Roschmann, Ludwigshafen-Edigheim (DE); Monica Fernandez Gonzalez, Frankenthal (DE)

(73) Assignee: BASF SE (DE)

( * ) Notice: Subject to any disclaimer, the term of this patent is extended or adjusted under 35 U.S.C. 154(b) by 579 days.

(21) Appl. No.: 12/063,937

(22) PCT Filed: Aug. 9, 2006

(86) PCT No.: PCT/EP2006/065194
§ 371 (c)(1),
(2), (4) Date: Feb. 15, 2008

(87) PCT Pub. No.: WO2007/020220
PCT Pub. Date: Feb. 22, 2007

(65) Prior Publication Data
US 2008/0233390 A1    Sep. 25, 2008

(30) Foreign Application Priority Data
Aug. 16, 2005  (DE) .................... 10 2005 038 608

(51) Int. Cl.
*B05D 3/02* (2006.01)
(52) U.S. Cl.
USPC .............. 427/385.5; 427/299; 427/388.1; 427/388.2; 427/388.4; 428/336; 428/463; 524/501; 524/502; 524/507; 524/517; 524/521; 524/522; 524/523; 524/525

(58) Field of Classification Search ............ 524/500, 524/502, 507, 517, 521, 522, 523, 525, 501; 427/299, 385.5, 388.1, 388.2, 388.4; 428/336, 428/463
See application file for complete search history.

(56) References Cited

U.S. PATENT DOCUMENTS

| | | | |
|---|---|---|---|
| 3,873,480 A * | 3/1975 | Braidich et al. ............. 524/52 |
| 6,376,570 B1 * | 4/2002 | Zhao et al. .................. 522/42 |
| 6,734,251 B2 * | 5/2004 | Nothnagel et al. ......... 524/871 |
| 6,756,459 B2 * | 6/2004 | Larson et al. .............. 526/274 |
| 2004/0143038 A1 * | 7/2004 | Aberle ........................ 524/27 |
| 2005/0163933 A1 * | 7/2005 | Dietsche et al. ............ 427/384 |
| 2007/0176149 A1 | 8/2007 | Dietsche et al. |

FOREIGN PATENT DOCUMENTS

| | | |
|---|---|---|
| CA | 2 575 008 A1 | 3/2006 |
| CA | 2 575 167 A1 | 3/2006 |
| DE | 10 2004 041 127 A1 | 3/2006 |
| DE | 10 2004 041 142 A1 | 3/2006 |
| EP | 1 193 298 A1 | 4/2002 |
| WO | WO-2004/074372 A1 | 9/2004 |

* cited by examiner

*Primary Examiner* — David W Wu
*Assistant Examiner* — Marie Reddick
(74) *Attorney, Agent, or Firm* — Novak Druce Connolly Bove + Quigg LLP

(57) ABSTRACT

The present invention relates to a composition for coating metallic surfaces, comprising a binder component; a corrosion inhibitor polymer based on an ethylenically monocarboxylic and dicarboxylic acid and, if appropriate, further ethylenical monomers, a solvent component, and, if appropriate, crosslinkable components, and also pigment/filler components. The invention further relates to processes for its preparation and also to methods of coating a metallic surface using the composition, to coated metallic surfaces thus obtained, and to the use of the composition as a primer, particularly in coil coating or in atmospheric corrosion control. After drying, the applied layer preferably has a thickness of at least 3.1 μm and is therefore thicker than a typical pretreatment layer.

27 Claims, No Drawings

POLYMER COMPOSITION FOR CORROSION PROTECTION

RELATED APPLICATIONS

This application is a national stage application (under 35 U.S.C. §371) of PCT/EP2006/065194, filed Aug. 9, 2006, which claims benefit of German application 10 2005 038 608.3, filed Aug. 16, 2005.

The present invention relates to compositions for coating metallic surfaces, to processes for preparing them, and to methods of coating a metallic surface by means of the composition; to coated metallic surfaces obtainable, and to the use of the polymer composition.

For producing sheetlike metallic workpieces such as, for example, automobile parts, bodywork parts, instrument casings, exterior architectural facings, ceiling panels or window profiles, suitable metal sheets are shaped by means of known techniques such as punching, drilling, folding, profiling and/or deep drawing. Larger components, such as automobile bodies, for example, are assembled if appropriate by welding together a number of individual parts. The raw material for this purpose normally comprises long metal strips, which are produced by rolling the metal and which for the purposes of storage and transportation are wound up to form what are called coils. The metallic components referred to must in general be protected against corrosion. In the automotive segment in particular the requirements in terms of present-day corrosion control are very high. Newer models of automobile are nowadays being warranted for up to 30 years against rust perforation. Modern automobile bodies are produced in multistage operations and have a multiplicity of different layers. In this context a steel panel is generally coated in a first step with zinc or a zinc alloy. This can be done by electroplating or by dipping in liquid zinc, known as hot dip galvanizing. In order to improve the corrosion resistance of the zinc layer itself, a predominantly inorganic pretreatment layer is applied subsequently. This may involve a phosphate treatment and/or chromate treatment with chromium (VI) or chromium(III) compounds. Chromium-free and phosphate-free pretreatment layers are also known. The pretreatment layer is also called a conversion coat or passivating layer. It is typically very thin. Normally the thickness of such a pretreatment layer is well below 1 µm. Typical thicknesses are 2 to 100 nm. As well as improving the corrosion resistance of the zinc layer, the pretreatment layer is also intended to enhance the adhesion between metal and subsequent coating films. The pretreatment layer is then coated with an organic primer material.

This system is followed by the actual coating films. In the case of automobiles the bodywork is then regularly coated with an electrocoat material and subsequently with the surfacer, as it is known. The surfacer layer is a comparatively thick, soft layer intended to prevent stone chipping or the like destroying the underlying layers. Atop the surfacer, finally, are applied one or more color paint films and also a clearcoat film for protection. For other applications, other coating films and/or coating sequences over the primer material are typical, too.

Whereas in the past the corrosion control treatment was carried out essentially on the finished metallic workpiece, such as on an automobile body assembled by welding, for example, the corrosion control treatment has in more recent times increasingly been practiced on the coil metal itself. In this system, at least the pretreatment layer and the organic primer material are applied to the actual coil metal (coil coating). Only after this are parts punched out, shaped, and, if appropriate, welded together. This places heightened requirements on the applied layers, since the latter are now subject to punching, forming and welding operations as well, in the course of which there should be no detractions from quality with regard to the layers.

Coil coating is the continuous coating of metal strips, or coils, with usually liquid coating materials. Metal coils with a thickness of 0.2 to 2 mm and a width of up to 2 m are transported at a speed of up to 200 m/min through a coil-coating line, and are coated in the process. For this purpose it is possible to use, for example, cold-rolled coils of soft steels or construction-grade steels, electrolytically galvanized thin sheet, hot-dip-galvanized steel coil, or coils of aluminum or aluminum alloys. Typical lines comprise a feed station, a coil store, a cleaning and pretreatment zone, a first coating station along with baking oven and downstream cooling zone, a second coating station with oven, laminating station, and cooling, and also a coil store and winder.

The coil-coating operation normally comprises the following process steps:

1. If necessary: cleaning of the metal coil to remove contamination accumulated during the storage of the metal coil, and to remove temporary corrosion control oils, by means of cleaning baths.
2. Application of a thin pretreatment layer (<1 µm) by a dipping or spraying method or by roller application. The purpose of this layer is to increase the corrosion resistance, and it serves to improve the adhesion of subsequent coating films on the metal surface. Known for this purpose are Cr(VI)-containing, Cr(III)-containing, and also chromate-free pretreatment baths.
3. Application of a primer by a roller application method. The dry layer thickness is typically about 5-8 µm. Solvent-based coating systems are generally used in this case.
4. Application of one or more topcoat layers by a roller application method. The dry layer thickness in this case is approximately 15-25 µm. Here again, solvent-based coating systems are generally employed.

Besides the above-described coil coating as a form of corrosion control on metals, in the case of heavy-duty (atmospheric) corrosion control the metallic material is provided with corrosion control only when in its ultimate form. This is the case, for example, with steel constructions having relatively large dimensions, such as bridges, metallic components on houses, large industrial plant components, and the like, for example. In view of their dimension and in some cases also their weight, many coating methods, such as dipping, for example, are not possible. In addition, frequently, no pretreatment layer is applied. In order to obtain adequate corrosion control in spite of this, primer material layers typically thicker than in the case of coil coating are applied.

Here as well, however, a pretreatment layer is possible in principle.

As was already stated above, numerous compositions for the pretreatment layer are of inorganic nature. To improve the properties of these pretreatment layers, numerous systems have been proposed. Among these, an increasingly important part is being played by organic systems.

WO-A 2004/074372, for example, describes a solution polymer for pretreatment, the component of this polymer that is active in corrosion inhibition being a copolymer comprising different ethylenically unsaturated monomer units.

In this case, the pretreatment layer should amount to not more than 3 µm.

A comparable system and also its production are described in the German patent applications having the application numbers DE-A 10 2004 041 127 and DE-A 10 2004 041 142.

In those cases the polymeric corrosion inhibitor is a polymer obtainable from a monoethylenically unsaturated monocarboxylic or dicarboxylic acid and, if appropriate, further ethylenically unsaturated comonomers.

In order to ensure corrosion control with maximum flexibility, of a kind which can be employed, for example, both in coil coating and in heavy-duty corrosion control, it would be desirable to provide corrosion control inhibitors, as described above, not only for the pretreatment layer but also, in general, as a corrosion inhibitor additive to compositions for coating metallic surfaces—for example, coating materials in general—and particularly for the priming coat, so that, for example, it would be possible if appropriate to omit the pretreatment layer, as in the case of atmospheric corrosion control, for example, or to improve further the corrosion control obtained when using such a pretreatment layer.

It is therefore an object of the present invention to provide a composition which can be used as a coating for metallic surfaces, for example, as a surface coating system, and in particular as a primer coating material, said composition comprising a corrosion control component based on a corrosion inhibitor polymer.

This object is achieved by means of a composition for coating metallic surfaces, comprising A 15% to 70% by weight, based on the total weight of the composition, of a binder component;

B 0.1% to 40% by weight, based on the total weight of the composition, of a corrosion control component comprising at least one corrosion inhibitor polymer obtainable from the polymerization of at least the monomers of the composition B1 0.1% to 95% by weight, based on the total amount of the monomers used to form the corrosion inhibitor polymer, of at least one monoethylenically unsaturated monocarboxylic acid;

and at least one monomer selected from B2 and B3,

B2 being 0.1% to 70% by weight, based on the total amount of the monomers used to form the corrosion inhibitor polymer, of at least one ethylenically unsaturated dicarboxylic acid of the general formula

(I), and/or

(II), or of the corresponding carboxylic anhydrides and/or of other hydrolyzable derivatives, $R^1$ and $R^2$ independently of one another being hydrogen or a straight-chain or branched, optionally substituted alkyl radical having 1 to 20 carbon atoms, or, in the case of (I), $R^1$ and $R^2$ together being an optionally substituted alkylene radical having 3 to 20 carbon atoms, and n being an integer from 0 to 5;

B3 being 0.1% to 70% by weight, based on the total amount of the monomers used to form the corrosion inhibitor polymer, of at least one further ethylenically unsaturated comonomer other than B1 and B2;

C 5% to 84.9% by weight, based on the total weight of the composition, of a solvent component;

D 0 to 30% by weight, based on the total weight of the composition, of a crosslinkable component;

E 0 to 70% by weight, based on the total weight of the composition, of a pigment/filler component.

F further components if appropriate.

It has in fact surprisingly been found that the composition described above, in which hitherto the corrosion control component B was used only for a pretreatment layer for inhibiting corrosion on metallic surfaces, is a suitable coating for metallic surfaces, in the form for example of a surface coating system, and in particular in the form of a primer coating material, and can be employed accordingly. An additional surprise was that a layer composed of the composition of the invention and having a thickness post drying of at least 3.1 µm ensures a corrosion inhibition effect.

The metallic surface may be the surface of metal sheets, foils, plates, and, in particular, metal strips (coils), but may also be the surface of buildings, scaffolding, bridges or the like, as is the case with atmospheric corrosion control.

The metallic surface may also relate to surfaces of shaped articles that can be used, for example, for lining, facing or cladding. Examples comprise automobile bodies or parts thereof, truck bodies, frames for two-wheelers such as motorcycles or pedal cycles, or parts of such vehicles, such as fenders or fairings, casings for household appliances such as washing machines, dishwashers, tumble driers, gas and electric ovens, microwaves, freezers or refrigerators, casings for industrial apparatus or installations such as machines, switch cabinets, computer housings or the like, construction elements in architecture, such as wall parts, facing elements, ceiling elements, window profiles or door profiles or dividing walls, furniture in metallic materials, such as metal cabinets, metal shelves, parts of furniture, or fittings. The metallic surface may also be that of hollow articles for storing liquids or other materials, such as cans, canisters or else tanks.

The starting material used for coating may also be a semi-finished metallic product. The term "semi-finished product" refers, conventionally, to prepared or pre-prepared raw materials for manufacturing, typically in relatively large dimensions. Generally speaking, such semi-finished product is composed exclusively of metal. It may be a single-layered material or else a material in which two or more layers of different metals follow one another.

The term "semi-finished metallic product" is also intended to comprise composite materials which have at least one metallic surface and in which at least one metallic layer is joined to at least one nonmetallic layer. The composite material in question may, for example, be a metal foil joined to a polymeric film.

With regard to the metals, particularly the metal sheets or metal strips (coils), the metal in question may for example be iron or steel, zinc, magnesium, aluminum, tin, copper or alloys of these metals with one another or with other metals. The steels may include both low-alloy and high-alloy steels.

The materials in question are preferably materials having metallic surfaces of zinc or zinc alloys or aluminum or aluminum alloys, and tin. The surface in question may in particular be that of galvanized iron or steel. In one preferred embodiment the surface is that of a coil metal, and in particular of coils of electrolytically galvanized or hot dip galvanized steel.

The term "galvanized" or "zinc-plated" or "aluminum-plated" also comprises, of course, coating with alloys of zinc or alloys of aluminum. Suitable alloys for coating metal strips (coils) are known to the skilled worker. Depending on the desired end application, the skilled worker selects the identity and quantity of alloying constituents. Typical constituents of zinc alloys comprise, in particular, Al, Mg, Pb, Fe, Mn, Co, Ni, Si, Mg, Sn, Cu or Cd, preferably Al and/or Mg. The alloys in question can also be Al/Zn alloys in which Al and Zn are present in approximately equal amounts. The coatings may be substantially homogeneous coatings or else coatings which exhibit concentration gradients. The system in question may, for example, comprise galvanized steel which has been additionally vapor-coated with Mg. This may produce a zinc/Mg alloy superficially. Steel coated with the alloys described is available commercially. Typical constituents of aluminum alloys comprise, in particular, Mg, Mn, Si, Zn, Cr, Zr, Cu or Ti. The metallic surfaces for treatment may of course also be thin oxidic/hydroxidic and/or carbonatic surface layers or layers of similar construction. Layers of this kind typically form on metallic surfaces in contact with the atmosphere, alone, and are encompassed by the term "metallic surface".

The metallic surface may additionally have already been protected against corrosion. By way of example, it may have been greased with corrosion control oils, may have a temporary corrosion control coating, or else may have been provided with a removable protective sheet. It will be appreciated that combinations of these measures are possible as well. If protective sheets are present, they are generally removed prior to coating with the composition of the invention. Temporary coatings and/or oils can likewise be removed if necessary.

The composition of the invention for coating the metallic surfaces comprises a plurality of components.

Binder Component A

The binder component may be composed of one or more binders. Generally speaking the skilled worker is aware of which binders are suitable. Examples of suitable binders particularly for use in coil coating include (meth)acrylate (co) polymers, partially hydrolyzed polyvinyl esters, polyesters, alkyd resins, polylactones, polycarbonates, polyethers, epoxy resin-amine adducts, polyureas, polyamides, polyimides or polyurethanes. It will be appreciated that mixtures of different polymers can be used as well, provided the mixing does not entail any unwanted effects.

The binder component A hereinbelow identifies, in a way which is known in principle, those fractions of the composition (formulation) that are responsible for the formation of a film. In the course of thermal and/or photochemical curing they form a polymeric network. They comprise thermally and/or photochemically crosslinkable components. The crosslinkable components may be of low molecular mass, oligomeric or polymeric. They have in general at least two crosslinkable groups. Crosslinkable groups may be either reactive functional groups able to react with groups of their own kind ("with themselves") or with complementary reactive functional groups. Various possible combinations are conceivable here, in a way which is known in principle. The binder system may comprise, for example, a polymeric binder which is not itself crosslinkable, and also one or more low molecular mass or oligomeric crosslinkers (V). Alternatively the polymeric binder itself may contain crosslinkable groups which are able to react with other crosslinkable groups on the polymer and/or on a crosslinker employed additionally. With particular advantage it is also possible to use oligomers or prepolymers which contain crosslinkable groups and are crosslinked with one another using crosslinkers.

Thermally crosslinkable or thermosetting binder systems crosslink when the applied layer is heated up to temperatures above room temperature. Coating systems of this kind are also referred to by the skilled worker as "baking varnishes". They contain crosslinkable groups which at room temperature do not react, or at least not at any substantial rate, but instead react only at high temperatures. Crosslinkable binder systems particularly suitable for the performance of the process of the invention are those which crosslink only at temperatures above 60° C., preferably 80° C., more preferably 100° C., and very preferably 120° C. With advantage it is possible to use those binder systems which crosslink at 100 to 250° C., preferably 120 to 220° C., and more preferably at 150 to 200° C.

Preference is given to using polyesters or epoxy resins or epoxy resin-amine adducts.

Suitable polyesters include, in particular, condensates of low molecular mass dicarboxylic acids and dialcohols. Examples of suitable dicarboxylic acids comprise aliphatic dicarboxylic acids such as adipic acid, azelaic acid, sebacic acid, and dodecanedioic acid, aliphatic-aliphatic acids such as dimer fatty acids, i.e., reaction products of unsaturated fatty acids with one another, cycloaliphatic dicarboxylic acids such as 1,4- or 1,3-cyclohexanedicarboxylic acid, tricyclodecanedicarboxylic acid, and aromatic dicarboxylic acids such as isophthalic acid, terephthalic acid or phthalic acid. As will be appreciated, derivatives of dicarboxylic acids as well can be used. Anhydrides are particularly suitable, such as phthalic anhydride, hexahydrophthalic anhydride or tetrahydrophthalic anhydride, for example.

Examples of suitable dialcohols comprise aliphatic alcohols such as ethylene glycol, diethylene glycol, triethylene glycol, propylene glycol, 1,3-butanediol, 1,3-propanediol, 1,4-butanediol, neopentyl glycol, 1-methylpropane-1,3-diol, 2-butyl-2-ethylpropanediol, pentanediols, hexanediols, octanediols, dodecanediol, neopentyl glycol hydroxylpivalate, cycloaliphatic alcohols such as 1,4- or 1,3-cyclohexanedimethanol, TCD alcohol and bis(4-hydroxycyclohexyl) methane and/or -propane, and dimer diols (hydrogenated dimer fatty acids). As will be appreciated, it is also possible in a known way to use derivatives of alcohols, such as esters, for example, particularly the corresponding methyl or ethyl esters.

Besides linear binders it is also possible to use branched binders. Suitable monomers for producing branches comprise tricarboxylic acids or their anhydrides such as trimellitic anhydride or trimesic acid, and trialcohols such as trimethylolalkanes, trimethylolethane or trimethylolpropane for example.

With preference it is possible to convert the polyesters to isocyanate-terminated polyesters, in whole or in part, by reaction with polyisocyanates.

The OH number of the polyesters used is typically about 10 to about 200 mg KOH/g, preferably 15 to 120 mg KOH/g, more preferably 20 to 80 mg KOH/g, and, for example, about 50 mg KOH/g. The molecular weights are typically 400 to 10 000 g/mol, preferably 500 to 5000 g/mol, and more preferably 1000 to 4000 g/mol.

Epoxy-functional polymers can be prepared by reacting epoxy-functional monomers such as bisphenol A diglycidyl ether, bisphenol F diglycidyl ether or hexanediol diglycidyl ether with phenols such as bisphenol A, bisphenol F and/or alcohols such as ethoxylated or propoxylated bisphenol A. Epoxy-functional polymers are available commercially, under the name Epon® or Epikote®, for example.

Epoxy resin-amine adducts can be obtained by reacting said epoxy-functional components with phenols and/or with aliphatic or cycloaliphatic dicarboxylic acids, acid polyesters or alcohols, thiols, and amines, particularly secondary amines such as diethanolamine or N-methylbutanolamine, for example.

It is additionally possible to use emulsion polymers as well. These polymers are particularly suitable for water-based formulations. Examples of suitable emulsion polymers or copolymers comprise acrylate dispersions, obtainable in conventional manner from acrylic acid and/or acrylic acid derivatives, examples being acrylic esters, and/or styrene. Dispersions of polyurethanes are suitable as well, prepared from aromatic and/or aliphatic diisocyanates and polyesters or aliphatic soft segments.

For systems which cure thermally, in particular, it is possible to perform the invention using, preferably, binder systems based on polyesters, epoxy resins, polyurethanes or acrylates.

Binders based on polyesters can be synthesized, in a way which is known in principle, from low molecular mass dicarboxylic acids and dialcohols and also, if appropriate, further monomers. Further monomers comprise, in particular, monomers having a branching action, examples being tricarboxylic acids or trialcohols. For coil coating it is common to use polyesters having a comparatively low molecular weight, preferably those with an $M_n$ of 500 to 10 000 g/mol, preferably 1000 to 5000 g/mol, and more preferably 2000 to 4000 g/mol.

The hardness and flexibility of the films based on polyesters can be influenced in a way which is known in principle, through the selection of "hard" or "soft" monomers. Examples of "hard" dicarboxylic acids comprise aromatic dicarboxylic acids or their hydrogenated derivatives such as, for example, isophthalic acid, terephthalic acid, phthalic acid, hexahydrophthalic acid and derivatives thereof, especially their anhydrides or esters. Examples of "soft" dicarboxylic acids comprise in particular aliphatic α,ω-dicarboxylic acids having at least 4 C atoms, such as adipic acid, azelaic acid, sebacic acid or dodecanedioic acid. Examples of "hard" dialcohols comprise ethylene glycol, 1,2-propanediol, neopentyl glycol or 1,4-cyclohexanedimethanol. Examples of "soft" dialcohols comprise diethylene glycol, triethylene glycol, aliphatic 1,ω-dialcohols having at least 4 C atoms, such as 1,4-butanediol, 1,6-hexanediol, 1-8-octanediols or 1,12-dodecanediol. Preferred polyesters for performing the invention comprise at least one "soft" monomer.

Polyesters for coatings are available commercially. Details of polyesters are given for example in "*Paints and Coatings—Saturated Polyester Coatings*" in Ullmann's Encyclopedia of Industrial Chemistry, 6th ed., 2000, Electronic Release.

Binder systems based on epoxides can be used for formulations having an organic or else an aqueous basis. Epoxy-functional polymers can be prepared, in a way which is known in principle, through the reaction of epoxy-functional monomers such as bisphenol A diglycidyl ether, bisphenol F diglycidyl ether or hexanediol diglycidyl ether with alcohols such as bisphenol A or bisphenol F, for example. Particularly suitable soft segments are polyoxyethylene and/or polyoxypropylene segments. These may be incorporated advantageously through the use of ethoxylated and/or propoxylated bisphenol A. The binders ought preferably to be chloride-free. Epoxy-functional polymers are available commercially, under the name Epon® or Epikote®, for example. Details of epoxy-functional polymers are given for example in "*Epoxy Resins*" in Ullmann's Encyclopedia of Industrial Chemistry, 6th. ed., 2000, Electronic Release.

The epoxy-functional binders may additionally be further functionalized. As mentioned above, epoxy resin-amine adducts, for example, can be obtained by reacting said epoxy-functional polymers with amines, especially secondary amines such as diethanolamine or N-methylbutanolamine, for example.

Polyacrylate-based binders are particularly suitable for water-based formulations. Examples of suitable acrylates comprise emulsion polymers or copolymers, especially anionically stabilized acrylate dispersions, obtainable in a conventional manner from acrylic acid and/or acrylic acid derivatives, examples being acrylic esters such as methyl (meth)acrylate, ethyl(meth)acrylate, butyl(meth)acrylate or 2-ethylhexyl(meth)acrylate and/or vinylaromatic monomers such as styrene, and also, if appropriate, crosslinking monomers. The hardness of the binders may be adjusted by the skilled worker, in a way which is known in principle, through the proportion of "hard" monomers such as styrene or methyl methacrylate and "soft" monomers such as butyl acrylate or 2-ethylhexyl acrylate. Employed with particular preference for the preparation of acrylate dispersions are, furthermore, monomers which have functional groups that are able to react with crosslinkers. These may in particular be OH groups. OH groups can be incorporated into the polyacrylates through the use of monomers such as hydroxyethyl acrylate, hydroxypropyl acrylate, hydroxybutyl acrylate or N-methylolacrylamide, or else of epoxy acrylates followed by hydrolysis. Suitable polyacrylate dispersions are available commercially.

Binders based on polyurethane dispersions are particularly suitable for water-based formulations. Dispersions of polyurethanes can be obtained in a manner which is known in principle by stabilizing the dispersion by incorporating ionic and/or hydrophilic segments into the PU chain. As soft segments it is possible to use preferably 20 to 100 mol %, based on the amount of all diols, of relatively high molecular mass diols, preferably polyester diols, having an $M_n$ of approximately 500 to 5000 g/mol, preferably 1000 to 3000 g/mol. With particular advantage it is possible to use, to perform the present invention, polyurethane dispersions which comprise bis(4-isocyanatocyclohexyl)methane as isocyanate component. Polyurethane dispersions of that kind are disclosed for example in DE-A 199 14 896. Suitable polyurethane dispersions are available commercially.

Suitable crosslinkers (V) for the thermal crosslinking are known in principle to the skilled worker.

Suitable examples include epoxide-based crosslinkers in which two or more epoxy groups are joined to one another by means of a linking group. Examples comprise low molecular mass compounds having two epoxy groups such as hexanediol diglycidyl ether, phthalic acid diglycidyl ether or cycloaliphatic compounds such as 3,4-epoxycyclohexylmethyl 3',4'-epoxycyclohexanecarboxylate.

Additionally suitable as crosslinkers are high-reactivity melamine derivatives, such as, for example, hexamethylolmelamine or corresponding etherified products such as hexamethoxymethylmelamine, hexabutoxymethylmelamine or else if appropriate modified amino resins. Crosslinkers of this kind are available commercially, as Luwipal® (BASF AG), for example.

Particular preference is given to using blocked polyisocyanates as crosslinkers to perform the invention. On blocking, the isocyanate group is reacted reversibly with a blocking agent. On heating to higher temperatures, the blocking agent is eliminated again. Examples of suitable blocking agents are disclosed in DE-A 199 14 896, column 12 line 13 to column 13 line 2. Particular preference is given to using polyisocyanates blocked with ε-caprolactam.

In order to accelerate the crosslinking it is possible, in a way which is known in principle, to add suitable catalysts to the preparations.

The skilled worker makes an appropriate selection from among the crosslinkers in accordance with the binder employed and the outcome desired. It will be appreciated that mixtures of different crosslinkers can also be used, subject to the proviso that this does not adversely affect the properties of the layer. The amount of crosslinker can advantageously be 10% to 35% by weight in relation to the total amount of the binder.

The epoxy-functional polymers can be crosslinked using, for example, crosslinkers based on polyamines, such as diethylenetriamine, for example, amine adducts or polyamino amides. Advantage is possessed for example by crosslinkers based on carboxylic anhydrides or by the crosslinkers already mentioned that are based on melamine. Particular preference is also given to the blocked polyisocyanates already mentioned.

For the thermal crosslinking of the acrylate dispersions, for example, it is possible to employ the aforementioned crosslinkers based on melamine or blocked isocyanates. Epoxy-functional crosslinkers as well are suitable, furthermore.

For the thermal crosslinking of polyurethane dispersions or polyesters it is possible to make use for example of the aforementioned crosslinkers based on melamine, blocked isocyanates or epoxy-functional crosslinkers.

In the case of photochemically crosslinkable compositions in particular the binder component A comprises photochemically crosslinkable groups. The term "photochemical crosslinking" is intended to comprise crosslinking with all kinds of high-energy radiation, such as UV, VIS, NIR or electronic radiation (electron beams), for example. The groups in question may in principle be all kinds of photochemically crosslinkable groups, preference here being given, however, to ethylenically unsaturated groups.

Photochemically crosslinkable binder systems generally comprise oligomeric or polymeric compounds containing photochemically crosslinkable groups, and also, if appropriate, in addition, reactive diluents, generally monomers. Reactive diluents have a viscosity lower than that of the oligomeric or polymeric crosslinkers, and therefore adopt the part of a diluent in a radiation-curable system. For photochemical crosslinking such binder systems further comprise in general one or more photoinitiators.

Examples of photochemically crosslinkable binder systems comprise, for example, polyfunctional(meth)acrylates, urethane(meth)acrylates, polyester(meth)acrylates, epoxy(meth)acrylates, carbonate(meth)acrylates, polyether(meth)acrylates, in combination if appropriate with reactive diluents such as methyl(meth)acrylate, butanediol diacrylate, hexanediol diacrylate or trimethylolpropane triacrylate. More precise details on suitable radiation-curable binders are given in WO 2005/080484 page 3 line 10 to page 16 line 35. Suitable photoinitiators are found in said specification on page 18 line 8 to page 19 line 10.

For the performance of the present invention it will be appreciated that it is also possible to use binder systems which can be cured by a combination of thermal and photochemical means (these systems also being known as dual-cure systems).

The composition of the invention comprises 15% to 70% by weight of binder component A. Also suitable, particularly for coil coating, are 20% to 70% by weight. The percentages by weight are based on the total weight of the composition of the invention. The weight fraction is preferably 30% to 60% by weight and more preferably 40% to 50% by weight.

For atmospheric corrosion control in particular the binder components A which are curable under atmospheric conditions may be the binder systems which are usual in the field of corrosion protection paints and coatings. Binders and binder systems of this kind are known in principle to the skilled worker. It will be appreciated that mixtures of different binder systems can also be used, provided the mixture is not attended by any unwanted effects.

The term "binder system" hereinbelow refers, in a way which is known in principle, to those fractions of the composition (formulation) that are responsible for the formation of a film.

The term "curable under atmospheric conditions" means that the binder systems have the capacity, following application to the surface under typical ambient conditions, i.e., approximately at room temperature, in the presence of air and also typical atmospheric humidity, to cure without the use of additional apparatus or equipment. Typical curing temperatures, depending on the environment, are more than 0 to 40° C., preferably 5 to 35° C., and, for example, 15 to 25° C. It is clear to the skilled worker that the time to complete curing of a given binder system may differ according to the ambient conditions actually prevailing.

Curing may proceed by a variety of mechanisms, depending on the nature of the binder system employed. By way of example the curing involved may be purely physical curing, produced by the evaporation of the solvent used. It may also be an oxidative curing through reaction of the binder system with the oxygen in the air. Finally, it may also be a chemical crosslinking (reactive crosslinking). Reactive binder systems comprise crosslinkable components. The crosslinkable components may be of low molecular mass, oligomeric or polymeric. The systems in question may be preferably one-component (1 K) or else two-component (2 K) systems Reactively crosslinking systems also comprise moisture-curing binder systems, where the atmospheric moisture functions as a curing component. It will be appreciated that a binder system may also cure through a combination of different curing methods. In the case of 2 K systems the binder component and curing component are mixed, in a way which is known in principle, before the formulation is used.

The invention can be performed using aqueously soluble or organically soluble binder systems. Preference is given to binder systems on an aqueous basis.

Binder systems for corrosion control coatings, especially corrosion control systems on an aqueous basis, are known in principle to the skilled worker. They may for example be epoxy resins, polyacrylates, styrene-acrylate polymers, polyesters, alkyd resins, polyurethanes of styrene-butadiene polymers.

The amount of the binders A in the formulation is 15% to 70% by weight, based on the amount of all of the components of the formulation, including the solvent. It is set by the skilled worker in accordance with the desired properties of the coating. The amount, particularly for atmospheric corrosion control, is preferably 20% to 60% by weight and more preferably 25% to 50% by weight.

Preferred binder systems for atmospheric corrosion control are described below.

Polyacrylates or Styrene-Acrylate Copolymers (A1)

In one preferred embodiment of the invention the binder system is an aqueous or predominantly aqueous dispersion of polyacrylates or styrene-acrylate copolymers (A1).

Aqueous dispersions of polyacrylates or styrene-acrylate copolymers (A1) for preparing corrosion control coatings are known in principle to the skilled worker. The aqueous dispersions of the polyacrylates (A1) may be either primary dispersions or secondary dispersions. Suitable polyacrylates comprise as principal monomers at least one alkyl(meth)acrylate such as, for example, methyl(meth)acrylate, ethyl(meth)acrylate, butyl(meth)acrylate or 2-ethylhexyl(meth)acrylate. They can have preferably as further principal monomers vinylaromatics, especially styrene. The amount of the principal monomers together is in general at least 60% by weight, preferably at least 80% by weight. Styrene-acrylate copolymers comprise in addition to the stated alkyl(meth)acrylates as principal monomer in general at least 30% by weight, preferably at least 40% by weight, and more preferably about 50% by weight of styrene. The polyacrylates or styrene-acrylate copolymers (A1) may additionally have further comonomers as well, particularly those containing functional groups such as hydroxyl, carboxyl or carboxamide groups. Examples comprise (meth)acrylic acid, itaconic acid, maleic acid, fumaric acid, (meth)acrylamide or hydroxyalkyl(meth) acrylates. Further comonomers are preferably acidic comonomers. In addition it is also possible, optionally, for crosslinking monomers to be present as well in small amounts, typically less than 4% by weight, preferably less than 2% by weight. Examples comprise butanediol (meth) acrylate, hexanediol di(meth)acrylate or allyl acrylate.

Polyacrylates (A1) can be prepared in a way which is known in principle by means of emulsion polymerization. Further details of such polymers and of their preparation are disclosed for example in EP-A 157 133, WO 99/46337, or in "*Paints and Coatings, 2.5. Acrylic Coatings*" in Ullmann's Encyclopedia of Technical Chemistry, 6th Edition 2000, Electronic Release. The skilled worker makes an appropriate selection from the polyacrylates (A1) possible in principle, in accordance with the desired properties of the layer.

Especially suitable for performing the invention in the field of atmospheric corrosion control are styrene-acrylate copolymers which comprise as principal monomers at least one elastomeric acrylate such as, for example, n-butyl(meth)acrylate, n-hexyl(meth)acrylate, n-octyl acrylate or 2-ethylhexyl (meth)acrylate in a mixture with styrene and also, as secondary monomer, at least one acidic monomer, such as (meth) acrylic acid, for example. For use as binders for the formulation it is possible for some or all of the acid groups to be neutralized with suitable bases, such as, for example, ammonia.

The polyacrylates employed ought in general to have a glass transition temperature $T_g$ in the range from 0 to 60° C., preferably in the range from 5 to 40° C. (measured by the DSC method in accordance with DIN EN ISO 11357). The glass transition temperature may be chosen by the skilled worker, in a way which is known in principle, through the selection and the proportion of hard monomers and soft monomers.

With preference for performing the invention it is possible additionally to use polyacrylates (A1) having an average particle size of 50 nm to 400 nm, more preferably 80 nm to 250 nm (measured with the Malvern® Autosizer 2 C).

Suitable acrylate dispersions and styrene-acrylate dispersions for preparing corrosion control coatings are available commercially, as for example Acronal® S 760 or Acronal® LR 8977 (BASF Aktiengesellschaft) or Acronal® Optive 410 (BASF Corporation).

Styrene-Alkadiene Polymers (A2)

In a second, preferred embodiment of the invention the binder system is an aqueous or predominantly aqueous dispersion of styrene-alkadiene polymers (A2).

Aqueous dispersions of styrene-alkadiene polymers (A2) for preparing corrosion control coatings are known in principle to the skilled worker and described for example in EP-A 47380. They may preferably be primary dispersions or else secondary dispersions.

Suitable polymers (A2) comprise as principal monomers styrene and also at least one conjugated aliphatic diene (alkadiene). The alkadienes may be, for example, butadiene, isoprene, 1,3-pentadiene or dimethylbutadiene. The styrene may also be substituted by alkyl groups. Examples comprise α-methylstyrene or 4-methylstyrene. The principal monomers are preferably styrene and butadiene. In general the polymers comprise at least 20% by weight styrene and 20% by weight alkadienes, the amount of the principal monomers together being in general at least 60% by weight, preferably at least 80% by weight. The quantities are based in each case on the sum of all of the monomers. They may additionally have further comonomers as well. Here mention may be made, on the one hand, of ethylenically unsaturated carboxylic and/or dicarboxylic acids such as (meth)acrylic acid, maleic acid or itaconic acid. Additionally the comonomers may be ethylenically unsaturated carbonitriles such as (meth)acrylonitrile and also alkyl(meth)acrylates such as methyl(meth)acrylate, n-butyl(meth)acrylate, n-hexyl(meth)acrylate, n-octyl acrylate or 2-ethylhexyl(meth)acrylate.

Styrene-alkadiene polymers (A2) can be prepared in a way which is known in principle by means of emulsion polymerization. Further details of styrene-butadiene polymers for coating materials and also of their preparation are disclosed for example in "*Paints and Coatings, 2.4.8. Polystyrene and Styrene Copolymers*" in Ullmann's Encyclopedia of Technical Chemistry, 6th Edition 2000, Electronic Release.

Particularly suitable for performing the invention are styrene-butadiene polymers which comprise as a secondary monomer one or more acidic monomers, such as, for example, (meth)acrylic acid, preferably in an amount of 0.5% to 5% by weight. For use as binders for the formulation it is possible with preference for some or all of the acid groups to be neutralized with suitable bases, such as ammonia.

The styrene-butadiene polymers (A2) employed ought in general to have a glass transition temperature $T_g$ in the range from 0 to 60° C., preferably in the range from 5 to 40° C. The glass transition temperature can be chosen by the skilled worker in a way which is known in principle through the selection and the proportion of hard monomers and soft monomers.

Preferably for performing the invention it is possible in addition to use styrene-butadiene polymers (A2) having an average particle size of 50 nm to 400 nm, more preferably 80 nm to 250 nm.

Polyurethanes (A3)

In a third, preferred embodiment of the invention the binder system, particularly for atmospheric corrosion control, is an aqueous or predominantly aqueous dispersion of polyurethanes (A3).

Aqueous dispersions of polyurethanes (A3) for preparing corrosion control coatings are known in principle to the skilled worker. Details of polyurethanes for coating materials and also of their preparation are disclosed for example in "Paints and Coatings, 2.9 Polyurethane Coatings" in Ullmann's Encyclopedia of Technical Chemistry, 6th Edition 2000, Electronic Release. The aqueous dispersions of the polyurethanes (A3) may be either primary dispersions or secondary dispersions.

Polyurethanes for aqueous dispersions can be synthesized, in a way which is known in principle, from customary diisocyanates and also diols. With a view to effective film formation and good elasticity, diols particularly suitable for this purpose are those having a number-average molecular weight $M_n$ of about 500 to 5000 g/mol, preferably about 1000 to 3000 g/mol. For this purpose it is possible to use both polyether diols and polyester diols. The amount of such diols of relatively high molecular weight is typically 10 to 100 mol % relative to the sum of all the diols. The desired hardness and elasticity of the film can be controlled by using, in addition to the diol already mentioned, low molecular weight diols having a number-average molecular weight $M_n$ of about 60 to 500 g/mol.

For the synthesis of polyurethanes for aqueous dispersions use is made, furthermore, of monomers which comprise at least one isocyanate group or one group which is reactive toward isocyanate groups, and also, additionally, at least one hydrophilic group. These may be nonionic groups such as polyoxyethylene groups, acidic groups such as COOH, sulfonate or phosphonate groups, or basic groups such as amino groups, for example. With preference they are acidic groups. For use as binders for the formulation it is possible with preference for all or some of the acid groups to be neutralized with suitable bases. Preferred for this purpose are ammonia or amines. Further details on such polyurethane dispersions and also their preparation are described at length in WO 2005/005565, page 4 line 13 to page 14 line 14. Further examples of suitable polyurethanes are disclosed in U.S. Pat. No. 5,707,941 or in WO 2004/101638, especially page 2 line 31 to page 14 line 11.

The polyurethanes may also have been modified. By way of example, the compounds in question may be oxidatively curing urethane alkyds. For preparation it is possible to subject, for example, triglycerides of unsaturated fatty acids to partial hydrolysis. The resultant OH group is able to react with the isocyanate groups in the course of polyurethane preparation.

With preference for performing the invention it is possible additionally to use polyurethanes (A3) having an average particle size of not more than 1000 nm, preferably less than 500, more preferably less than 200 nm, and in particular 20 to 200 nm.

Alkyd Resins (A4)

In a fourth, preferred embodiment of the invention the binder system, particularly for atmospheric corrosion control, is an aqueous or predominantly aqueous dispersion of alkyd resins (A4).

Aqueous dispersions of alkyd resins (A4) for preparing corrosion control coatings are known in principle to the skilled worker. Alkyd resins (A4) are oxidatively curing polycondensation resins of polyols and polybasic carboxylic acids, in which at least one OH group of the polyol is esterified with fatty oils and/or with natural and/or synthetic mono- or polyunsaturated fatty acids, it being necessary for at least one of the polyols employed to have a functionality of three or more.

Examples of preferred polyhydric alcohols comprise glycerol, pentaerythritol, trimethylolethane, trimethylolpropane, various diols such as ethanediol/propane-diol, diethylene glycol and neopentyl glycol.

Preferred polybasic carboxylic acids are phthalic acid (anhydride) (PAn), isophthalic acid, terephthalic acid, trimellitic anhydride, adipic acid, azelaic acid, sebacic acid; phthalic acid (anhydride) is particularly preferred.

Examples of suitable oil components or fatty acids include drying oils, such as linseed oil, oiticica oil or tung oil, semi-drying oils, such as soybean oil, sunflower oil, safflower oil, ricinene oil or tall oil, nondrying oils, such as castor oil, coconut oil or peanut oil, or free fatty acids of above oils.

The molar mass $M_n$ of typical alkyd resins is between 1500 and 20 000 g/mol, preferably between 3500 and 6000 g/mol. The acid number is preferably 2 to 30 mg KOH/g, or else 35-65 mg KOH/g in the case of water-dilutable resins. The OH number is generally up to 300, preferably up to 100 mg KOH/g.

The term "alkyd resins" is also intended to comprise modified alkyd resins such as styrene-modified alkyd resins, urethane alkyds, urethane oils or epoxy resin-modified alkyd resins. Modified alkyd resins of this kind are known to the skilled worker.

Further details of alkyd resins (A4) for coating materials and also of their preparation are disclosed for example in "Paints and Coatings, 2.6. Alkyd Coatings" in Ullmann's Encyclopedia of Technical Chemistry, 6th Edition 2000, Electronic Release, and also in "Lackformulierung und Lackrezeptur" [Paint Formulation and Paint Formula], edited by Ulrich Zorll, p. 188 ff., Curt R. Vinzentz Verlag, Hanover, 2003.

The alkyd resins (A4) employed ought in general to have a glass transition temperature $T_g$ in the range from 0 to 60° C., preferably from 5 to 40° C.

As binder component A it is possible, in addition to the binders already mentioned, to use other binders or, exclusively, binders based on waxes.

Here as well the wax is preferably in dispersed, finely divided form.

The term "wax" is known to the skilled worker and defined for example in Römpp-Lexikon "Lacke und Druckfarben", Georg Thieme Verlag, Stuttgart, N.Y. 1998, pp. 615/616 or "Ullmann's Encyclopedia, 6th edition, Electronic Release; Waxes; 1.2. Definition". The skilled worker includes PTFE waxes here as well, although they are actually not waxes in the sense of the definition (see, e.g., Römpp, loc. cit. pages 466/467). The term "wax" embraces both the wax itself and any auxiliaries used to form a wax dispersion. The skilled worker is aware of waxes for use in aqueous dispersions, and will make an appropriate selection.

Preferred waxes are oligomeric or polymeric substances which have a molecular weight of more than 200 g/mol, preferably more than 400 g/mol, and feature a weight fraction of more than 60% by weight of structural elements selected from the group of (—$CH_2$—$CH_2$—)
(—$CH_2$—CH<)
(—$CH_2$—CH($CH_3$)—)
(—$CH_3$)
($CR_2$=$CR_2$) and ($CR_2$=$CR(CR_3)$)

where R is H and/or F, and with the proviso that said structural elements are joined to one another in such a way that they comprise predominantly units of at least 12 carbon atoms directly linked to one another. It is of course possible to use a mixture of different waxes.

The waxes may also have acid functions, especially carboxylic acid groups, which may be in neutralized or non-neutralized form. Waxes having an acid number <200 mg KOH/g are preferred. Particular preference is given to an acid number of 3 to 80 mg KOH/g. Waxes which exhibit a melting point are preferred. Particular preference is given to a melting point of 40 to 200° C. A melting point of 60 to 120° C. is particularly preferred.

Examples of suitable waxes for performing the present invention comprise the following [CAS numbers in square brackets]:

polyethylene wax [9002-88-4]
a paraffin wax [8002-74-2]
montan wax and montan wax raffinates, e.g. [8002-53-7]
polyethylene-polypropylene waxes
polybutene waxes
Fischer-Tropsch waxes
carnauba wax
oxidized waxes, such as oxidized polyethylene wax corresponding to [68441-17-8]
copolymeric polyethylene waxes, examples being copolymers of ethylene with acrylic acid, methacrylic acid, maleic anhydride, vinyl acetate, vinyl alcohol, for example [38531-18-9], [104912-80-3], [219843-86-4] or copolymers of ethylene with two or more of these monomers
polar modified polypropylene waxes, e.g. [25722-45-6]
microcrystalline waxes, examples being microcrystalline paraffin waxes [63231-60-7]
montanic acids, e.g. [68476-03-9]

metal salts of montanic acids, sodium salts [93334-05-5] and calcium salts [68308-22-5] for example esters of long-chain carboxylic acids with long-chain alcohols, an example being octadecyl stearate [2778-96-3]

montanic esters of polyhydric alcohols, examples being
  montan wax glycerides [68476-38-0], including those with partial hydrolysis
  montanic esters of trimethylolpropane [73138-48-4], including those with partial hydrolysis
  montanic esters of 1,3-butanediol [73138-44-0], including those with partial hydrolysis
  montanic esters of ethylene glycol [73138-45-1], including those with partial hydrolysis montan wax ethoxylates, e.g. [68476-04-0]

fatty acid amides, e.g., erucamide [112-84-5], oleamide [301-02-0], and 1,2-ethylenebis(stearamide) [110-30-5]

long-chain ethers, octadecyl phenyl ether for example.

Mixtures of waxes as well are suitable, examples being
  mixtures of octadecyl stearate and partially hydrolyzed montanic esters of polyhydric alcohols
  mixtures of paraffin waxes and partially hydrolyzed montanic esters of polyhydric alcohols and/or montanic acids
  mixtures of polyethylene wax and polyethylene glycol.

Particularly preferred waxes are those delivered in a form in which they can be incorporated with particular ease into the formulation for the process of the invention, such as micronized waxes and/or wax dispersions, for example.

Micronized waxes are particularly fine powders having an average particle size of preferably between 20 μm, more preferably 2 to 15 μm. Wax dispersions are aqueous preparations of waxes which comprise water, optionally further, water-miscible solvents, spherical wax particles, and, generally, auxiliaries. Preferred wax dispersions for use in the present invention have a particle size below 1 μm, preferably 20 to 500 nm, more preferably 50 to 200 nm. Micronized waxes and prepared wax dispersions are available commercially.

Auxiliaries are used in wax dispersions in order for example to ensure the dispersibility of the wax and its stability on storage. The auxiliaries may, for example, be bases for full or partial neutralization of acid functions in the wax, examples being alkali metal hydroxides, ammonia, amines or alkanolamines. Acid groups may also have been fully or partly neutralized with cations, examples being $Ca^{++}$ or $Zn^{++}$. Further possible auxiliaries are surface-active substances, preferably nonionic or anionic surfactants. Examples of nonionic surfactants comprise ethoxylates and propoxylates based on alcohols and hydroxyaromatics and also their sulfation and sulfonation products. Examples of anionic surfactants comprise alkyl sulfonates, arylsulfonates, and alkylarylsulfonates.

Particularly suitable for performing the present invention are wax dispersions having a pH of less than 7, preferably those with a pH less than 6.

Further useful binders for the binder component A are disclosed in U.S. Pat. No. 6,403,826.

Binder component A may further comprise silanes as disclosed in WO-A 01/07679. Described here are silanes of the formula $XR^{22}Si(OR^{21})_3$, each $R^{21}$ being selected from the group consisting of hydrogen, $C_{1-6}$ alkyl and $C_{2-6}$ alkanoyl; $R^{22}$ is a $C_{1-10}$) alkanediyl, substituted if appropriate by hydroxyl, amine or thiol groups and/or interrupted by an amine, ether or thioether bridge, and X is a reactive group selected from the group consisting of $NH_2$-glycidoxy, -(meth)acryloyloxy, -vinyloxy, thiol, and urea.

Corrosion Control Component B

The corrosion control component B may comprise one or more corrosion inhibitors. However, it comprises at least one corrosion inhibitor polymer obtainable from the polymerization with at least the monomer B1 and at least one monomer selected from B2 and B3.

Preferably the polymerization takes place only with the monomers B1, B2, or B1, B3 or B1, B2, B3. With particular preference the product is a terpolymers of the monomers B1, B2, and B3.

Monomer B1 is at least one monoethylenically unsaturated monocarboxylic acid. It is, of course, also possible to use mixtures of two or more different ethylenically unsaturated monocarboxylic acids.

Examples of suitable monoethylenically unsaturated monocarboxylic acids B1 comprise acrylic acid, methacrylic acid, crotonic acid, vinyl acetic acid or else $C_1$-$C_4$ monoesters of monoethylenically unsaturated dicarboxylic acids. Preferred monomers are acrylic acid and methacrylic acid, particular preference being given to acrylic acid.

0.1 to 95% by weight of monomer B1 are used, in particular 30% to 70% by weight, the amount being based on the total amount of all monomers used to form the corrosion inhibitor polymer. It is preferred to use 40% to 65% by weight of monomer B1, more preferably 45% to 62% by weight, and very preferably 50% to 60% by weight.

Monomer B2 is at least one monoethylenically unsaturated dicarboxylic acid of the general formula $(HOOC)R^1C=CR^2(COOH)$ (I) and/or $R^1R^2C=C(-(CH_2)_n-COOH)(COOH)$ (II).

Mixtures of two or more different monomers B2 can be used as well. In the case of (I) the species concerned may in each case be the cis and/or the trans form of the monomer. The monomers may also be used in the form of the corresponding carboxylic anhydrides or other hydrolyzable carboxylic acid derivatives. Where the COOH groups are arranged in cis form it is possible with particular advantage to use cyclic anhydrides.

$R^1$ and $R^2$ are, independently of one another, H or a straight-chain or branched, optionally substituted alkyl radical having 1 to 20 carbon atoms. The alkyl radical preferably has 1 to 4 carbon atoms. With particular preference $R^1$ and $R^2$ respectively are each H and/or a methyl group. The alkyl radical may also, optionally, contain further substitutents, provided that the latter have no adverse effect on the performance properties of the corrosion inhibitor polymer or of the composition of the invention.

In the case of the formula (I) it is further possible for $R^1$ and $R^2$ together to be an alkylene radical having 3 to 20 carbon atoms, which additionally may optionally be further substituted. The ring formed from the double bond and the alkylene radical preferably comprises 5 or 6 carbon atoms. Examples of alkylene radicals comprise in particular a 1,3-propylene or a 1,4-butylene radical, which may also contain further alkyl groups as substituents. n is an integer from 0 to 5, preferably 0 to 3, and more preferably 0 or 1.

Examples of suitable monomers B2 of the formula (I) comprise maleic acid, fumaric acid, methylfumaric acid, methylmaleic acid, dimethylmaleic acid, and, if appropriate, the corresponding cyclic anhydrides. Examples for formula (II) comprise methylenemalonic acid and itaconic acid. Preference is given to using maleic acid or maleic anhydride and also itaconic acid.

Where monomers B2 are employed the amount used is 0.1% to 70% by weight, in particular 0.5 to 65% by weight, this amount being based on the total amount of all monomers used to form the corrosion inhibitor polymer. Preference is given to using 10% to 65% by weight of monomers B2, further preferably 10% to 62% by weight, more preferably 15% to 61% by weight, and very preferably 20% to 60% by weight. Preferred ranges are likewise 12% to 55% by weight of the monomers B2, further preferably 15% to 40% by weight, and in particular 17% to 25% by weight.

Where monomers B3 are employed the amount used is 0.1 to 70% by weight, the amount being based on the total amount of all monomers used to form the corrosion inhibitor polymer.

The monomers B3 serve to fine-tune the properties of the copolymer. It is of course also possible to use two or more different monomers B3. They are selected by the skilled worker in accordance with the desired properties of the copolymer. The monomers B3 are likewise free-radically polymerizable.

Preferably they are likewise monoethylenically unsaturated monomers. In particular cases, however, small amounts of monomers having two or more polymerizable groups may also be used. By this means it is possible to crosslink the copolymer to a small extent.

Monomers B3 can be acidic and/or basic and/or neutral monomers. Preferably they are neutral monomers and/or acidic monomers.

For the case that two or more monomers B3 are used, preferably 0.1%-40% by weight of acid-group-containing monomers, in particular P-containing and sulfonic acids, and 0%-30% by weight of further monomers are used.

Examples of suitable monomers B3 comprise, in particular, monomers which contain phosphoric acid and/or phosphonic acid groups. Particular mention may be made here of vinylphosphonic acid, monovinyl phosphate, allylphosphonic acid, monoallyl phosphate, 3-butenylphosphonic acid, mono-3-butenyl phosphate, mono(4-vinyloxybutyl) phosphate, phosphonoxyethyl acrylate, phosphonoxyethyl methacrylate, mono(2-hydroxy-vinyloxypropyl) phosphate, mono(1-phos-phonoxymethyl-2-vinyloxyethyl) phosphate, mono(3-allyloxy-2-hydroxypropyl) phosphate, mono[2-(allyloxy-1-phosphonoxymethylethyl)]phosphate, 2-hydroxy-4-vinyloxymethyl-1,3,2-dioxaphosphole, 2-hydroxy-4-allyloxymethyl-1,3,2-dioxa-phosphole. Additionally, salts and/or esters, especially $C_1$-$C_8$ monoalkyl, dialkyl, and, if appropriate, trialkyl esters, of the monomers containing phosphoric acid and/or phosphonic acid groups can be used.

Of further suitability are monomers containing sulfonic acid groups, such as allylsulfonic acid, methallylsulfonic acid, styrenesulfonate, vinylsulfonic acid, allyloxybenzenesulfonic acid, 2-acrylamido-2-methylpropanesulfonic acid or 2-(methacryloyl)ethyl sulfonic acid and their salts and/or esters.

Further acidic monomers comprise, for example, monomaleamides.

Examples of substantially neutral monomers B3 comprise $C_1$-$C_{18}$ alkyl esters or $C_1$-$C_4$ hydroxyalkyl esters of (meth)acrylic acid, such as methyl(meth)acrylate, ethyl(meth)acrylate, propyl(meth)acrylate, isopropyl(meth)acrylate, butyl(meth)acrylate, hexyl(meth)acrylate, 2-ethylhexyl(meth)acrylate, hydroxyethyl(meth)acrylate, hydroxypropyl(meth)acrylate or butane-1,4-diol monoacrylate, (methyl)styrene, maleimide or N-alkylmaleimide.

Of further suitability are vinyl ethers or allyl ethers such as methyl vinyl ether, ethyl vinyl ether, propyl vinyl ether, isobutyl vinyl ether, 2-ethylhexyl vinyl ether, vinyl cyclohexyl ether, vinyl 4-hydroxybutyl ether, decyl vinyl ether, dodecyl vinyl ether, octadecyl vinyl ether, 2-(diethylamino)ethyl vinyl ether, 2-(di-n-butylamino)ethyl vinyl ether or methyl diglycol vinyl ether, and the corresponding allyl compounds.

It is likewise possible to use vinyl esters such as vinyl acetate or vinyl propionate, for example.

Examples of basic monomers comprise acrylamides and alkyl-substituted acrylamides, such as acrylamide, methacrylamide, N-tert-butylacrylamide or N-methyl(meth)acrylamide.

It is also possible to use alkoxylated monomers, ethoxylated monomers in particular. Of particular suitability are alkoxylated monomers which derive from acrylic acid or methacrylic acid and have the general formula (III)

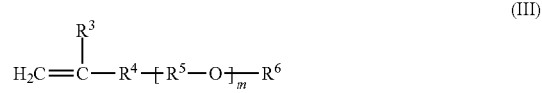

in which the variables have the following definitions:
$R^3$ hydrogen or methyl;
$R^4$ —$(CH_2)_x$—O—, —$CH_2$—$NR^7$—, —$CH_2$—O—$CH_2$—$CR^8R^9$—$CH_2$—O— or —CONH—; —COO-(ester)
$R^5$ identical or different $C_2$-$C_4$ alkylene radicals which can be arranged blockwise or randomly, the fraction of ethylene radicals being at least 50 mol %;
$R^6$ hydrogen, $C_1$-$C_4$ alkyl, —$SO_3M$ or —$PO_3M_2$;
$R^7$ hydrogen or —$CH_2$—$CR^1$=$CH_2$;
$R^8$ —O—$[R^5$—$O]_n$—$R^6$, it being possible for the radicals —$[R^5$—$O]_n$— to be different from the further radicals —$[R^5$—$O]_m$— comprised in formula (III);
$R^9$ hydrogen or ethyl;
M alkali metal or hydrogen, preferably hydrogen;
m 1 to 250, preferably 2 to 50, more preferably 3 to 10;
x 0 or 1, and n, $R^1$ possess the definition as in formula (II).

Examples of crosslinking monomers comprise molecules having two or more ethylenically unsaturated groups, examples being di(meth)acrylates such as ethylene glycol di(meth)acrylate or butane-1,4-diol di(meth)acrylate or poly(meth)acrylates such as trimethylolpropane tri(meth)acrylate or else di(meth)acrylates of oligoalkylene or polyalkylene glycols, such as di-, tri- or tetraethylene glycol di(meth)acrylate. Further examples comprise vinyl(meth)acrylate or butanediol divinyl ether.

The skilled worker will make an appropriate selection from the monomers B3 in accordance with the desired properties of the polymer and the desired use of the polymer.

As monomer B3 it is preferred to use monomers comprising phosphonic acid and/or phosphoric acid groups, particularly vinylphosphonic acid or its salts and/or the $C_1$-$C_8$ esters thereof. Particularly preferred monomers B3 are vinylphosphonic acid or its salts; in particular vinylphosphonic acid.

The amount of all monomers B3 used is together 0.1% to 70% by weight, in particular 0.2% to 65% by weight, based on the total amount of all monomers used to form the corrosion inhibitor polymer. Preferably the amount is 0.5% to 60% by weight, more preferably 1% to 50%, and very preferably 2% to 40% by weight. In the case of vinylphosphonic acid, preference is given to 10% to 30%, in particular 15% to 25% by weight. If crosslinking monomers B3 are present their amount should generally not exceed 5% by weight, preferably 2% by weight, more preferably 1% by weight, based on the total amount of all monomers used for the process. The amounts can for example be 10 ppm to 1% by weight.

A combination of the monomers acrylic acid (B1), maleic acid (B2), and vinylphosphonic acid (B3) is preferred as component B.

A preferred component B therefore comprises a corrosion inhibitor polymer obtainable from the polymerization of acrylic acid as monomer B1, maleic acid as monomer B2, and vinylphosphonic acid as monomer B3.

With further preference component B comprises no further corrosion inhibitor polymers.

The abovementioned amounts also apply for this corrosion inhibitor polymer.

The monomers used can be polymerized free-radically in aqueous solution or in organic solvents or any desired mixtures.

The term "aqueous" denotes that the solvent or diluent employed contains water as its major constituent. In addition, however, there may also be fractions of water-miscible organic solvents present and also, if appropriate, small amounts of emulsifiers. This may be advantageous in order to enhance the solubility of certain monomers, particularly the monomers B3, in the reaction medium. Preferably, however, no emulsifiers are present.

The solvent or diluent used accordingly contains at least 50% by weight of water with respect to the total amount of the solvent. In addition there may be one or more water-miscible solvents employed. Particular mention is made here of alcohols, examples including monoalcohols such as ethanol, propanol, isopropanol, dialcohols such as glycol, diethylene glycol or polyalkylene glycols or derivatives thereof. Preferred alcohols are propanol and isopropanol. The water fraction is preferably at least 70% by weight, more preferably at least 80% by weight, very preferably at least 90% by weight. With very particular preference water is employed exclusively.

The term "organic solvent" ("or organic solvent") denotes that the solvent or diluent employed comprises an organic solvent as its major constituent. In addition, however, it is also possible for fractions of water to be present. Examples of organic solvents comprise hydrocarbons such as toluene, xylene or mixtures of the kind obtained, for example, in petroleum refining and available commercially, for example, as petroleum spirit, kerosine, Shellsol®, Solvesso® or Ricella®, ethers, such as diethyl ether, tetrahydrofuran, dioxane, ether glycol acetates such as butyl glycol acetate, ketones such as acetone, methyl ethyl ketone, alcohols, examples being monoalcohols such as methanol, ethanol, propanol or isopropanol, dialcohols such as glycol, $C_1$-$C_{10}$ mono- or dialkyl glycols, diethylene glycol or polyalkylene glycols and derivatives thereof. Preferred organic solvents are butyl glycol, isopropanol, methanol, tetrahydrofuran, dioxane, petroleum spirit, and Solvesso, more preferably butyl glycol, isopropanol, petroleum spirit, and Solvesso, and very preferably butyl glycol. The amount of each of the monomers employed is chosen by the skilled worker such that the monomers are soluble in the respective solvent or diluent employed. More sparingly soluble monomers, accordingly, are used by the skilled worker only to the extent to which they can be dissolved. If appropriate it is possible to add small amounts of emulsifiers in order to enhance the solubility.

Where monomers are used which are relatively slow to react, such as dicarboxylic acids or corresponding dicarboxylic anhydrides, it has proven advantageous to carry out the reaction in the presence of bases. In that case the polymerization takes place preferably in the presence of 2 to 19.9 mol % of at least one amine. This quantity is based on the total amount of all COOH groups of the monocarboxylic acid B1 and of the dicarboxylic acids B2. Other acidic groups present if appropriate are disregarded. In other words, therefore, some of the COOH groups are neutralized. It is of course also possible to use a mixture of two or more organic amines.

The amines used may contain one or more primary and/or secondary and/or tertiary amino groups and also the corresponding number of organic groups. The organic groups may be alkyl, aralkyl, aryl or alkylaryl groups. Preferably they are straight-chain or branched alkyl groups. They may additionally contain further functional groups. Functional groups of this kind are, preferably, OH groups and/or ether groups. It is also possible to use amines which per se are not readily water-soluble, since in contact with the acidic monomers ammonia ions are formed which advantageously enhance the water-solubility. The amines can also be ethoxylated.

Examples of suitable amines comprise linear, cyclic and/or branched $C_1$-$C_8$ mono-di-, and trialkylamines, linear or branched $C_1$-$C_8$ mono-, di- or trialkanolamines, especially mono-, di- or trialkanolamines, linear or branched $C_1$-$C_8$ alkyl ethers of linear or branched $C_1$-$C_8$ mono-, di- or trialkanolamines, oligoamines and polyamines such as diethylenetriamine, for example.

The amines may also be heterocyclic amines, examples being morpholine, piperazine, imidazole, pyrazole, triazoles, tetrazoles and piperidine. With particular advantage it is possible to use heterocycles of the kind which have corrosion inhibition properties. Examples comprise benzotriazole and/or tolyltriazole. Through this combination it is possible to improve corrosion control properties further.

It is possible as well, furthermore, to use amines which contain ethylenically unsaturated groups, especially monoethylenic amines. Amines of this kind fulfill a dual function both as amine for neutralization and as monomer (B3). Allylamine, for example, can be used.

The skilled worker will make an appropriate selection from the amines.

Preference is given to amines having only one amino group. Further preferred are linear or branched $C_1$-$C_8$ mono-, di- or trialkanolamines, particular preference being given to mono-, di-, and triethanolamine and/or the corresponding ethoxylated products.

The amount of amine used is preferably 2 to 18 mol %, more preferably 3 to 16 mol %, and very preferably 4 to 14 mol %. Very particular preference is given to 5 to 7 mol % and also 11 to 14 mol %.

The amine can be added before or during the polymerization. Preferably it is added before or no later than at the beginning of the polymerization. The base can be added either all at once or in a time range corresponding at maximum to the total reaction time. The amine can be mixed into the monomer feed, either to the monocarboxylic acid or the dicarboxylic acid, or to both, and metered in together with them. In other words, therefore, the carboxylic acids are metered in partly in the form of the corresponding ammonium salts. The amine is preferably metered directly into the initial charge. To carry out the polymerization it has proven appropriate here to introduce the dicarboxylic acid or, if appropriate, its cyclic anhydride in the initial charge and thereafter to meter in the amine before further monomers and/or initiator are metered in, without any intention that the invention should hereby be tied to this procedure.

The free-radical polymerization is initiated preferably through the use of suitable thermally activable polymerization initiators. Alternatively, however, it can also be initiated by means of appropriate radiation, for example. The free-radical initiators ought to be soluble in the solvent of the reaction.

Among the thermally activable polymerization initiators preference is given to initiators having a decomposition temperature in the range from 30 to 150° C., in particular from 50 to 120° C. This temperature figure relates, as is usual, to the 10 h half-life.

Initiators which can be used include all compounds which break down into free radicals under the polymerization conditions, such as, for example, inorganic peroxo compounds, such as peroxodisulfates, especially ammonium, potassium, and preferably sodium peroxodisulfate, peroxosulfates, hydroperoxides, percarbonates and hydrogen peroxide, and the initiators known as redox initiators. Preference is given to using initiators soluble in the solvent of the polymerization mixture. In certain cases it is advantageous to use mixtures of different initiators, examples being mixtures of hydrogen peroxide and sodium or potassium peroxo disulfate. Mixtures of hydrogen peroxide and sodium peroxodisulfate can be used in any ratio at all.

Suitable organic peroxo compounds are diacetyl peroxide, di-tert-butyl peroxide, diamyl peroxide, dioctanoyl peroxide, didecanoyl peroxide, dilauroyl peroxide, dibenzoyl peroxide, bis(o-toloyl) peroxide, succinyl peroxide, tert-butyl peracetate, tert-butyl permaleinate, tert-butyl perisobutyrate, tert-butyl perpivalate, tert-butyl peroctoate, tert-butyl perneodecanoate, tert-butyl perbenzoate, tert-butyl peroxide, tert-butyl hydroperoxide, cumene hydroperoxide, tert-butyl peroxy-2-ethyl-hexanoate, and diisopropyl peroxydicarbamate.

Preferred initiators are, moreover, azo compounds. These may be soluble in organic solvents, such as, for example, 2,2'-azobis(4-methoxy-2,4-dimethylvaleronitrile), dimethyl 2,2'-azobis(2-methylpropionate), 1,1'-azobis(cyclohexane-1-carbonitrile), 1-[(cyano-1-methylethyl)azo]formamide, 2,2'-azobis(N-cyclohexyl-2-methylpropionamide), 2,2'-azobis(2,4-dimethylvaleronitrile), 2,2'-azobis(2-methylbutyronitrile), 2,2'-azobis[N-(2-propenyl)-2-methylpropionamide], and 2,2'-azobis(N-butyl-2-methylpropionamide).

Preferred water-soluble azo compounds are, for example, 2,2'-azobis[2-(5-methyl-2-imidazolin-2-yl)propane]dihydrochloride, 2,2'-azobis[2-(2-imidazolin-2-yl)propane]disulfate dihydrate, 2,2'-azobis[N-(2-carboxyethyl)-2-methylpropionamidine]tetrahydrate, 2,2'-azobis{2-[1-(2-hydroxyethyl)-2-imidazolin-2-yl]propane}dihydrochloride, 2,2'-azobis{2-methyl-N-[1,1-bis(hydroxymethyl)-2-hydroxyethyl]propionamide, 2,2'-azobis[2-methyl-N-(2-hydroxyethyl)propionamide], 2,2'-azobis[2-(2-imidazolin-2-yl)propane]dihydro-chloride, 2,2'-azobis(2-methylpropionamide)dihydrochloride, 2,2'-azobis[2-(3,4,5,6-tetrahydropyrimidin-2-yl)propane]dihydrochloride, 2,2'-azobis[2-(2-imidazolin-2-yl)propane], and 2,2'-azobis{2-methyl-N-[2-(1-hydroxybutyl)]-propionamide}.

Initiators additionally preferred are, moreover, redox initiators. The redox initiators comprise at least one of the abovementioned peroxo compounds as oxidizing component and, as reducing component, for example, ascorbic acid, glucose, sorbose, ammonium or alkali metal hydrogen sulfite, sulfite, thiosulfate, hyposulfite, pyrosulfite or sulfide, or sodium hydroxymethylsulfoxylate. As the reducing component of the redox catalyst it is preferred to use ascorbic acid or sodium pyrosulfite. Based on the amount of monomers used in the polymerization the amount used of the reducing component of the redox catalyst is $1\times10^{-5}$ to 1 mol %, for example.

In combination with the initiators or with the redox initiator systems it is additionally possible to use transition metal catalysts, examples being salts of iron, cobalt, nickel, copper, vanadium, and manganese. Suitable salts are, for example, iron(II) sulfate, cobalt(II) chloride, nickel(II) sulfate, and copper(I) chloride. The reductive transition metal salt is typically used in an amount of 0.1 to 1 000 ppm, based on the sum of the monomers. Particular advantage attaches, for example, to combinations of hydrogen peroxide and iron(II) salts, such as a combination of 0.5 to 30% by weight hydrogen peroxide and 0.1 to 500 ppm $FeSO_4 \times 7H_2O$, in each case based on the sum of the monomers.

Examples of suitable photoinitiators comprise acetophenone, benzoin ethers, benzyl alkyl ketones, and derivatives thereof.

It is preferred to use thermal initiators, with azo compounds and peroxo compounds being more preferred. Particular preference for polymerizations in aqueous solution is given to inorganic peroxo compounds, especially hydrogen peroxide and, in particular, sodium peroxodisulfate, or mixtures thereof, optionally in combination with 0.1 to 500 ppm of $FeSO_4 \times 7H_2O$, and 2,2'-azobis(2-methylpropionamide)dihydrochloride. Hydrogen peroxide and sodium peroxodisulfate are very particularly preferred. Preferred initiators for organic solvents are organic peroxides and also azo compounds that are soluble in organic solvents. Particular preference is given to 2,2'-azobis(2-methylbutyrontrile), 2,2'-azobis(2,4-dimethylvaleronitrile), and di-tert-butyl peroxide.

It is of course also possible to use mixtures of different initiators, provided they do not negatively affect one another. The amount is determined by the skilled worker in accordance with the desired copolymer. As a general rule, 0.05% to 30%, preferably 0.1% to 15%, and more preferably 0.2% to 8% by weight of the initiator, based on the total amount of all monomers, are used.

It is additionally possible, in a way which is known in principle, also to make use of suitable regulators, such as mercaptoethanol, for example. Preferably no regulators are used.

Apart from this, the temperature can be varied by the skilled worker within wide limits in accordance with the nature of the monomers employed, the initiator, and the desired copolymer. A minimum temperature of approximately 60° C. has proven appropriate here. The temperature can be kept constant during the polymerization, or else temperature profiles can be run.

The polymerization temperature is preferably 75 to 125° C., more preferably 80 to 120° C., very preferably 90 to 110° C., and, for example, 95 to 105° C.

The polymerization can be performed in typical apparatus for free-radical addition polymerization. Where operation takes place at above the boiling temperature of water or of the organic solvent or of the mixture of water and further solvents, a suitable pressure vessel is used; otherwise, operation may take place at atmospheric pressure.

If a slow-to-react monomer such as dicarboxylic acids or corresponding dicarboxylic anhydrides or vinylphosphonic acid is used, it has generally proven appropriate, for the polymerization, to include this monomer in the initial charge to the reaction vessel. Thereafter it is possible, if appropriate, to add the amine. The skilled worker is aware of the potential reaction of carboxylic anhydrides with nucleophilic reactants, which in the case, for example, of difunctional nucleophiles can lead to monomer constituents which have a crosslinking effect. He or she chooses the reaction conditions such that the desired products are formed. Thereafter it is possible to meter in the monocarboxylic acid, further monomers B3 if appropriate, and the initiator, advantageously likewise in aqueous solution. Feed times of 0.5 h to 24 h have been found appropriate, preferably 1 h to 12 h, more preferably 2 to 8 h. In this way the concentration of the monocarboxylic acids, which are relatively eager to react, in the aqueous solution is kept relatively low. This reduces the tendency of the monocarboxylic acid to react with itself, and results in a more uniform incorporation of the dicarboxylic acid units into the copolymer. After all of the monomers have been supplied there may be a subsequent reaction period of, for example, 0.5 to 3 h. This ensures that the polymerization reaction proceeds to maximum possible completion. Completion may also be achieved by repeating the addition of polymerization initiator.

It will, however, be appreciated that the skilled worker can also perform the polymerization in other ways.

In certain circumstances not only carboxylic anhydrides but also other monomers employed that contain hydrolyzable groups, such as esters, for example, may undergo complete or partial hydrolysis, depending on the polymerization conditions. The copolymers then comprise the monomers with the acid group resulting from the hydrolysis, in copolymerized form, or else comprise both unhydrolyzed groups and hydrolyzed groups alongside one another.

The synthesized copolymers may be isolated from the aqueous solution by means of customary methods known to the skilled worker, such as by evaporating down the solution, by spray drying, by freeze drying or by precipitation. The polymers may of course also be purified by means of purification methods known to the skilled worker, such as by ultrafiltration.

With particular preference, however, the copolymers are not purified at all after the polymerization; instead, the copolymer solutions obtained are used as they are for the composition of the invention.

It is nevertheless entirely possible to carry out the polymerization in the aqueous medium and, by means of solvent exchange, to prepare a polymer solution in an organic solvent from an aqueous polymer solution. This can be accomplished by methods known to the skilled worker, such as by evaporating down the solution, spray drying, freeze drying or precipitation. Thereafter the polymer is again dissolved or dispersed in an organic solvent. It is also possible to exchange the solvent continuously, such as for example by adding a second solvent to a polymer solution in a first solvent, and distilling off the first solvent. The second solvent can be added continuously or in portions or as a single addition.

The composition of the copolymers corresponds substantially to the ratio of the monomers B1, B2, and, optionally, B3 employed. As a general rule, therefore, the copolymers comprise 0.1% to 95% by weight of monomer units derived from monoethylenically unsaturated monocarboxylic acid B1 and 0.1-70% by weight of monomer units derived from the monoethylenically unsaturated dicarboxylic acid B2 of the general formula $(HOOC)R^1C=CR^2(COOH)$ (I) and/or $R^1R^2C=C(-(CH_2)_n-COOH)(COOH)$ (II) and/or 0.1 to 70% by weight of monomer units derived from further ethylenically unsaturated comonomers B3, with $R^1$, $R^2$, and n being as defined above.

Where hydrolyzable derivatives of monomers B2 and B3 are employed the polymer, depending on the hydrolysis rate and the conditions, may also comprise fractions of unhydrolyzed monomers.

There also exist, however, further processes for preparing the corrosion inhibitor polymer for the corrosion control component B.

The corrosion inhibitor polymer is soluble or at least dispersible in water or organic solvents, the skilled worker being aware that the solubility of COOH-rich polymers can be heavily pH-dependent. The term "dispersible" means that, although the solution is not entirely clear, the polymer is distributed homogeneously therein and also does not settle. The copolymers in question are preferably copolymers which are soluble in the solvent.

The polymers of the invention generally have a low pH. For mixing with components A and C and also, if appropriate, D, E and F, either the polymer solution can be used directly or the pH is adjusted by addition of base or acid.

A preferred pH range for blending is generally 4 to 11, preferably 5 to 10, and more preferably 6 to 9, with very particular preference 7 to 8.9.

If the pH of the polymer solution after polymerization is lower, it can be raised by adding base. Examples of bases for this purpose are alkali metal and alkaline earth metal hydroxides and carbonates, ammonia, or amines.

The amines used may contain one or more primary and/or secondary and/or tertiary amino groups and also the corresponding number of organic groups. The organic groups may be alkyl, aralkyl, aryl or alkylaryl groups. Preferably they are straight-chain or branched alkyl groups. They may additionally contain further functional groups. Functional groups of this kind are, preferably, OH groups and/or ether groups. The amines can also be ethoxylated.

Examples of suitable amines comprise linear, cyclic and/or branched $C_1$-$C_8$ mono-, di-, and trialkylamines, linear or branched $C_1$-$C_8$ mono-, di- or trialkanolamines, especially mono-, di- or trialkanolamines, linear or branched $C_1$-$C_8$ alkyl ethers of linear or branched $C_1$-$C_8$ mono-, di- or trialkanolamines, oligoamines and polyamines such as diethylenetriamine, for example.

The amines may also be heterocyclic amines, examples being morpholine, piperazine, imidazole, pyrazole, triazoles, tetrazoles and piperidine. With particular advantage it is possible to use heterocycles of the kind which have corrosion inhibition properties. Examples comprise benzotriazole and/or tolyltriazole. Through this combination it is possible to improve corrosion control properties further.

The same also applies, mutatis mutandis, if the pH is higher than the desired level. In that case acids are added, such as linear or branched $C_1$ to $C_{20}$ aliphatic, unsaturated or aromatic carboxylic acids, hypophosphorous acid, phosphonic acids or derivatives, phosphoric acid or derivatives, sulfuric acid, sulfonic acid, such as methanesultonic acid, vinylsulfonic acid, allylsulfonic acid, m-nitro-benzenesulfonic acid, naphthalenesulfonic acid and derivatives thereof, nitric acid or hydrofluoric acid.

The molecular weight $M_w$ (weight average) of the copolymers of the invention is at least 1000 g/mol, preferably at least 3000 g/mol, more preferably at least 5000 g/mol, and very preferably at least 10 000 g/mol. It is also possible to obtain molecular weights of more than 1 000 000 g/mol. Typically $M_w$ is 3000 g/mol to 1 500 000 g/mol, preferably 5000 g/mol to 1 000 000 g/mol, more preferably 8000 g/mol to 750 000 g/mol, and, for example, 15 000 g/mol to 500 000 g/mol. The molecular weight is set down by the skilled worker in accordance with the desired application.

Preferred polymers comprise acrylic acid and maleic acid or itaconic acid as monomers and also, if appropriate, further comonomers B3. Further comonomers may be, preferably, monomers containing phosphoric or phosphonic acid groups, an example being vinylphosphonic acid, or (meth)acrylic esters such as, for example methyl(meth)acrylate, ethyl (meth)acrylate, propyl(meth)acrylate, butyl(meth)acrylate or else hydroxyethyl(meth)acrylate.

Particular preference is given to copolymers comprising acrylic acid, maleic acid, and 5% to 40% by weight of monomers (B3) comprising phosphonic acid and/or phosphoric acid groups. Moreover B3 preferably comprises vinylphosphonic acid and/or its salts and/or the $C_1$-$C_8$ esters thereof, more preferably vinylphosphonic acid.

To form the corrosion inhibitor polymer for the corrosion control component B of the composition of the invention it is possible with preference to use acrylic acid-maleic acid copolymers having a maleic acid content of 20.01% to 40% by weight, 25% to 40% by weight for example. Additionally preferred are terpolymers of 55% to 78%, preferably 65% to 78%, and more preferably 65% to 75% by weight acrylic acid, 20.01% to 34%, preferably 21% to 34%, and more preferably 22% to 30% maleic acid, and 1% to 24.99%, preferably 2% to 24%, and more preferably 5% to 22% by weight vinylphosphonic acid, which under certain circumstances may also be present partly in the form of the esters thereof.

By way of example a terpolymer can be used of 71% to 73% by weight acrylic acid, 23% to 25% by weight maleic acid, and 3% to 5% by weight vinylphosphonic acid. Further examples comprise terpolymers of 55% to 62% by weight acrylic acid, 20.01% to 22% by weight maleic acid, and 16% to 24% by weight vinylphosphonic acid, and also terpolymers of 65% to 70% by weight acrylic acid, 21% to 25% by weight maleic acid, and 6% to 12% by weight vinylphosphonic acid.

It is preferred to use copolymers having a relatively high molecular weight $M_w$ to treat metallic surfaces, particularly those with $M_w$ from 1000 to 1.5 million g/mol, preferably 5000 to 1 million g/mol, more preferably 10 000 to 800 000 g/mol, and very preferably 20 000 to 500 000 g/mol. In the case of acrylic acid/maleic acid/vinylphosphonic acid terpolymers it is possible with preference to use polymers having a molecular weight $M_w$ of 1000 to 100 000 g/mol, preferably 5000 to 80 000 g/mol, more preferably of 10 000 to 50 000 g/mol, and, for example, of 15 000 to 30 000 g/mol.

It is of course also possible to use any desired mixtures of different polymers as component B.

The corrosion control component B is present with a weight fraction, based on the total weight of the composition, of 0.1% to 40% by weight. The fraction is preferably 0.2 to 30, more preferably 0.5 to 20, very preferably 1 to 10.

Solvent Component C

The solvent component C is made up of one or more solvents.

Generally speaking, use is made here of a suitable solvent, in which the components are in solution and/or dispersion, in order to allow uniform application to the surface.

In the case of coil coating, the use of the solvent may be dispensed with if appropriate.

Suitable solvents are those capable of dissolving, dispersing, suspending or emulsifying the compounds of the invention. These may be organic solvents or water. As well, of course, mixtures of different organic solvents or mixtures of organic solvents with water can be used. From among the solvents possible in principle, the skilled worker will make an appropriate selection in accordance with the nature of the components employed for the composition of the invention.

Examples of organic solvents comprise hydrocarbons such as toluene, xylene or mixtures of the kind obtained in petroleum refining and available commercially, for example, as petroleum spirit, kerosine, Solvesso®, Shellsol® or Ricella®, ethers, ether glycol acetates such as butyl glycol acetate, ketones such as acetone, alcohols such as methanol, ethanol or propanol.

Additionally the solvent component may constitute water or a predominantly aqueous solvent mixture. By such are meant mixtures of the kind comprising at least 50% by weight, preferably at least 65% by weight, and more preferably at least 80% by weight water. Further components are water-miscible solvents. Examples comprise monoalcohols such as methanol, ethanol or propanol, higher alcohols such as ethylene glycol or polyether polyols and ether alcohols such as butyl glycol or methoxypropanol.

The amount of the solvents is chosen by the skilled worker in accordance with the desired properties of the composition of the invention and the desired application method. The composition may also be prepared first as a concentrate and only on site be diluted to the desired concentration.

The weight fraction for the solvent component C, based on the total weight of the composition of the invention, is 5% to 84.9% by weight. It is preferably 10% to 80%, more preferably 20% to 70%, and very preferably 30% to 60% by weight.

Crosslinkable Component D

The crosslinkable component D may comprise one or more crosslinkers. Some crosslinkers have already been mentioned above. Particularly when the composition of the invention is used for coil coating it is advantageous to have a crosslinker present. Crosslinking customarily takes place following application of the composition of the invention, by means of thermal treatment. A photochemical (actinic) treatment is also possible. In the case of atmospheric corrosion control a thermal treatment of this kind frequently cannot be carried out, and so for this end use it is preferred not to have a crosslinking component D present in the composition of the invention.

For the crosslinking component D there may be thermally crosslinking groups or photochemically crosslinking groups present. Examples of suitable crosslinkers include epoxy-based crosslinkers in which two or more epoxy groups are joined to one another by means of a linking group. Examples comprise low molecular mass compounds having two epoxy groups such as hexanediol diglycidyl ether, phthalic acid diglycidyl ester or cycloaliphatic compounds such as 3,4-epoxycyclohexyl-methyl 3',4'-epoxycyclohexanecarboxylate.

Further examples of suitable crosslinkers comprise melamine-type crosslinkers, examples being crosslinkers of the Luwipal® range available commercially from BASF Aktiengesellschaft.

Particular preference is given to using blocked polyisocyanate crosslinkers. In the blocking context the isocyanate group is reacted reversibly with a blocking agent. On heating to higher temperatures, the blocking agent is eliminated again. Examples of suitable blocking agents are disclosed in DE-A 199 14 896, column 12, line 13 to column 13, line 2. Polyisocyanates blocked with ε-caprolactam are used with particular preference.

Crosslinkers suitable for photochemical crosslinking are, for example, Dibasonat® grades from BASF or oligomeric acrylates.

If a crosslinker is employed separately it is usual to use 0.5% to 10%, preferably 1% to 8%, and more preferably 2% to 6% by weight. As will be appreciated, mixtures of different crosslinkers can also be used, provided that the properties of the layer are not adversely affected as a result of so doing.

Based on the total weight of the composition the weight fraction of the crosslinking component D is 0 to 30% by weight. If component D is to be present, its fraction is preferably 1% to 25%, more preferably 2% to 20%, and very preferably 5% to 15% by weight.

Pigment/Filler Component E

The pigment/filler component E may comprise one or more pigments and/or fillers.

If a filler is used it may also comprise an additional organic coating, for the purpose of hydrophobizing or hydrophilizing, for example. The filler ought not to exceed an average particle size of 10 μm. Preferably the average particle size is 10 nm to 9 μm and more preferably it is 100 nm to 5 μm. In the case of round or approximately round particles this figure refers to the diameter; in the case of particles of irregular shape, such as with needle-shaped particles, for example, it refers to the longest axis. By particle size is meant the primary particle size. The skilled worker is aware, of course, that finely divided solids frequently undergo agglomeration to larger particles, which for use must be dispersed intensively. The particle size is selected by the skilled worker in accordance with the desired properties of the layer. It is guided, for example, by the desired layer thickness as well. As a general rule, the skilled worker will select smaller particles for a low layer thickness.

Suitable fillers include on the one hand electrically conductive pigments and fillers. Additives of this kind serve to improve the weldability and to improve subsequent coating with electrocoat materials. Examples of suitable electrically conducting fillers and/or pigments comprise phosphides, vanadium carbide, titanium nitride, molybdenum sulfide, graphite, carbon black or doped barium sulfate. Preference is given to using metal phosphides of Zn, Al, Si, Mn, Cr, Fe or Ni. Examples of preferred metal phosphides comprise CrP, MnP, $Fe_3P$, $Fe_2P$, $Ni_2P$, $NiP_2$ or $NiP_3$. Iron phosphides are available commercially, for example, under the name Ferrophos®.

It is also possible to use nonconducting pigments or fillers, such as finely divided amorphous silicon oxides, aluminum oxides or titanium oxides, for example, which may also have been doped with further elements. As an example it is possible to use amorphous silicon dioxide modified with calcium ions.

Further examples of pigments comprise anticorrosion pigments such as zinc phosphates and zinc silicates, zinc metaborate or barium metaborate monohydrate, nanodisperse oxides, and other anticorrosion pigments familiar to the skilled worker, as described for example in M. J. Austin's "Surface coatings—Raw Materials and their Use", vol. 1, 3rd ed., Chapman & Hall, London 1993 on pp. 409-34.

It will be appreciated that mixtures of different pigments can also be used. The pigments are used preferably in an amount of 10% to 70% by weight. The precise amount is determined by the skilled worker in accordance with the desired properties of the layer. When using conductivity pigments the amounts employed are normally greater than when using nonconducting fillers. Preferred amounts in the case of conductive pigments and fillers are 40% to 70% by weight, in the case of nonconductive pigments 20% to 50% by weight.

Component E has a weight fraction, based on the total weight of the composition, of 0 to 70% by weight. The fraction is preferably 5% to 60%, more preferably 10% to 50%, more preferably still 20% to 40%, and with particular preference 35% by weight.

Further Components F

The composition of the invention may also comprise one or more auxiliaries and/or additives. The purpose of such auxiliaries and/or additives is to fine-tune the properties of the layer. Their amount generally does not exceed 20% by weight, based on the total weight of the composition, and preferably the fraction does not exceed 10% by weight.

Examples of suitable additives are color and/or effect pigments, reactive diluents for the thermal cure or the actinic radiation cure, rheological assistants, UV absorbers, light stabilizers, free-radical scavengers, initiators for the free-radical polymerization, thermal crosslinking catalysts, photoinitiators and photocoinitiators, slip additives, polymerization inhibitors, defoamers, emulsifiers, degassing agents, wetting agents and dispersants, adhesion promoters, flow control agents, film-forming assistants, rheological control additives (thickeners), flame retardants, siccatives, antiskinning agents, other corrosion inhibitors, waxes, and matting agents, such as are known from the textbook "Lackadditive" [Additives for Coatings] by Johan Bieleman, Wiley-VCH, Weinheim, N.Y., 1998 or from German patent application DE-A 199 14 896, column 13, line 56 to column 15, line 54.

Examples of suitable corrosion inhibitors include phosphonic acid, aminophosphonates, organic and inorganic phosphates, examples being those of zinc, calcium, and magnesium, vinylphosphonic acid and its salts, carboxylic acids and their salts and esters, alkanolamines and amines, benzotriazole and its structural derivatives such as tolytriazole, for example, acetylene derivatives, such as N,N-dimethyl-2-propyne-1-amine, N,N-diethyl-2-propyne-1-amine, 1,1-dimethyl-2-propynyl-1-amine, N,N-diethyl-4-amino-2-butyne-1-ol, 2,5-dimethyl-3-hexyne-2,5-diol, 3-hexyne-2,5-diol, 2-butyne-1,4-diol ethoxylate, 2-butyne-1,4-diol, 2-butyne-1, 4-diol propoxylate, propargyl alcohol, propargyl alcohol ethoxylate, propargyl alcohol propoxylate, propynesulfonic acid and its salts. Further suitable corrosion inhibitors are aldehydes, amine- and sodium-neutralized phosphoric esters of alkyl alcohols, amine carboxylates, aminophenols and nitrophenols, aminoalcohols, aminobenzimidazole, aminoimidazolines, aminotriazole, benzimidazolamines, benzothiazoles, boric esters with various alkanolamines, such as boric acid diethanolamine ester, for example, butynediol, quinoline derivatives, dibenzyl sulfoxide, dicarboxylic acids and their esters, diisobutenylsuccinic acid, dithiophosphonic acid, fatty amines and fatty acid amides, guanidine derivatives, urea and its derivatives, laurylpyridinium chloride, maleamides, mercaptobenzimidazole, N-2-ethylhexyl-3-aminosulfopropionic acid, phosphonium salts, phthalamides, polyetheramines, sulfonium salts, sulfonic acids such as methanesulfonic acid, for example, thioethers, thioureas, thiuram sulfides, and cinnamic acid and its derivatives.

Preferred additives are dibutyltin dilaurate as a thermal crosslinking catalyst.

The present invention further provides for the preparation of a composition of the invention, comprising the steps of
a) contacting components A, B and C and, if appropriate, D, E and F, and
b) mixing the components.

In this case it is advantageous if in step a) component A is supplied as a dispersion and component B as a solution or emulsion.

The composition is prepared by intensive mixing of the components. Suitable mixing or dispersing equipment is known to the skilled worker.

The present invention additionally provides a method of coating a metallic surface, comprising the steps of
(a) applying to said metallic surface a layer of a composition of the invention;
(b) if appropriate, crosslinking the applied layer; and
(c) drying the layer.

Where crosslinking takes place thermally, steps (b) and (c) may be combined into one step.

Step (a) may be preceded by a pretreatment step. For applications in atmospheric corrosion control the pretreatment may preferably take place solely by mechanical cleaning, such as grinding, brushing or blasting with sand or dry ice.

In the case of coil coating, these pretreatment steps may be accompanied or replaced as an alternative by further steps. This comprises chemical cleaning and also the application of a pretreatment layer. This layer may likewise incorporate the corrosion inhibitor component B described above.

In the case of uses for atmospheric corrosion control, application of the layer may take place by simple brushing, spreading, swabbing or spraying.

Particularly in the case of coil coating, modified treatment steps are sensible.

In the case of coil coating as well, application of the layer may be preceded by a cleaning operation. Where the treatment of the invention takes place immediately after a metallic surface treatment, such as an electrolyte galvanization or a hot dip galvanization of steel coils, then the coils may generally be contacted with the composition of the invention by coating without cleaning beforehand. Where, however, the metal coils for treatment have been stored and/or transported prior to coating, they generally carry corrosion control oils or at least are soiled to an extent such that cleaning should take place prior to coating. Cleaning can take place by methods known to the skilled worker, using customary cleaning agents. In the method of the invention for applying the composition of the invention, the application of the composition to the surface of the metal may take place, for example, by spraying, dipping or rolling.

After a dipping operation the workpiece can be left to drip-dry, in order to remove excess preparation; in the case of metal sheets, foils or the like it is also possible to remove excess preparation by squeezing off or squeegeeing. Application with the preparation takes place generally at room temperature, although this is not intended to rule out the possibility in principle of higher temperatures.

The process of the invention is preferably used to coat metal coils. In this coil-coating operation, coating may be performed either on one side or on both sides. It is also possible to coat the top and bottom faces using different formulations.

With very particular preference, coil coating takes place by means of a continuous process. Continuously operating coil-coating lines are known in principle. They generally comprise at least one coating station, a drying or baking station and/or UV station, and, if appropriate, further stations for pretreatment or after treatment, such as rinsing or after rinsing stations, for example. Examples of coil-coating lines are found in Römpp Lexikon Lacke und Druckfarben, Georg Thieme Verlag, Stuttgart, N.Y., 1998, page 55, "Coil coating", or in German patent application DE 196 32 426 A1. It will be appreciated that lines with a different construction can also be employed.

The speed of the metal coil is selected by the skilled worker in accordance with the application properties and curing properties of the preparation employed. Speeds which have proven appropriate are in general from 10 to 150 m/min, preferably 12 to 120 m/min, more preferably 14 to 100 m/min, very preferably 16 to 80, and in particular 20 to 70 m/min.

The composition of the invention can be applied in any desired way, by spraying, pouring or roll coating, for example. Among these application techniques, roll coating is particularly advantageous and is therefore used with preference in accordance with the invention.

Each application step roll coating can be carried out with two or more rolls. Preference is given to employing from two to four rolls, and especially two rolls.

In roll coating, the rotating pick-up roll dips into a reservoir of the coating material of the invention (the composition of the invention) and so picks up the coating material that is to be applied. This material is transferred from the pick-up roll to the rotating application roll directly or via at least one transfer roll. The coating material is stripped from this application roll and so transferred to the coil as it runs in the same or opposite direction.

As an alternative, the coating material can be pumped directly into a nip between two rolls, this being referred to by those in the art as nip feed.

In accordance with the invention, transfer by reverse stripping, or the reverse roller coating technique, is of advantage and is therefore employed with preference.

In the case of roll coating, the circumferential speeds of the pick-up roll and of the application roll may vary greatly from one coating operation to another. The application roll preferably has a circumferential speed which is 110% to 125% of the coil speed, and the pick-up roll has a circumferential speed, preferably, which is 20% to 40% of the coil speed.

In the case of the particularly preferred coating of metal coils, coating may be performed on one side and on both sides. With very particular preference coating takes place by means of a continuous process.

Coating may be performed, for example, by means of a continuously operating coil coating plant, as described in Römpp Lexikon Lacke und Druckfarben, Georg Thieme Verlag, Stuttgart, N.Y., 1998, page 55, "Coil coating", or in German patent application DE 196 32 426 A1. It will be appreciated that plants of other construction can also be used.

Following the application of the composition used in accordance with the invention, any solvent present in the layer is removed and the layer is crosslinked. This can take place in two separate steps, but can also take place simultaneously. To remove the solvent the layer is preferably heated by means of an appropriate apparatus. Drying may also take place by contacting with a stream of gas. The two methods can be combined.

The curing method is guided by the nature of the binder or the crosslinker and as a general rule takes place thermally. However, it is also possible to cure with actinic radiation or through a combination of thermal and actinic radiation curing. Joint curing with heat and actinic radiation is also referred to by those in the art as dual cure. Actinic radiation here and below means electromagnetic radiation, such as near infrared, visible light, UV radiation or x-rays, especially UV radiation, or particulate radiation, such as electron beams.

In the case of thermal crosslinking, the applied coating is heated. This can preferably be carried out by convection heat transfer, radiation with near or far infrared and/or, in the case of coils based on iron, by electrical induction.

The temperature needed for curing is guided in particular by the binder or crosslinker employed. Highly reactive crosslinkers can be cured at lower temperatures than crosslinkers of relatively low reactivity. The temperature of the layer for curing is typically between 120 and 250° C.

Very reactive binder systems can also be cured at lower temperatures than less reactive binder systems. As a rule, the crosslinking is performed at temperatures of at least 60° C., preferably at least 80° C., more preferably at least 100° C., and with particular preference at least 120° C. The crosslinking can in particular be performed at 100 to 250° C., preferably 120 to 220° C., and with particular preference 150 to 200° C. In each case temperature referred to is the peak temperature found on the metal (peak metal temperature (PMT)), which can be measured by methods familiar to the person skilled in the art (for example contactless infrared measurement or determination of the temperature with adhered test strips).

Heating of the coating films of the invention in the case of thermal curing takes place preferably by convection heat transfer, irradiation with near or far infrared and/or, in the case of iron-based coils, by electrical induction.

The heating time, i.e., the duration of the thermal cure, varies depending on the coating material of the invention that is employed. The time is preferably from 10 s to 2 min.

Where substantially convection heat transfer is employed, the need in the case of the preferred coil running speeds is for forced-air ovens with a length of 30 to 50 m, particularly 35 to 45 m. The forced-air temperature is preferably 350° C.

Thermal curing of the coating films of the invention can be assisted further by exposure to actinic radiation.

Curing, however, can also take place with actinic radiation alone, as described for example in German patent application DE 198 35 206 A1.

Photochemical curing takes place by means of actinic radiation. By actinic radiation is meant, here and below, electromagnetic radiation, such as near infrared, visible light, UV radiation or x-rays, or particulate radiation, such as electron beams. For photochemical curing it is preferred to employ UV/VIS radiation. Irradiation may also be carried out, if appropriate, in the absence of oxygen, such as under an inert-gas atmosphere. The photochemical cure may take place under standard temperature conditions, i.e., without the coating being heated, or alternatively photochemical crosslinking can take place at elevated temperatures of, for example, 40 to 150° C., preferably 40 to 130° C., and in particular at 40 to 100° C.

In the case of atmospheric corrosion control, following its application to the surface, the applied coating cures under atmospheric conditions. At its most simple this can be accomplished by the gradual evaporation of the solvent. Depending on the nature of the binder employed, other crosslinking processes may also run their course.

Depending on the thickness of the desired corrosion control coat, the entire coat can be applied in a single operation, or else two or more coats of equal kind can be applied in succession and cured in each case, in order to achieve the desired total thickness of the corrosion control coat.

After it has been dried the applied layer has a thickness preferably of at least 3.1 μm and is therefore thicker than a typical pretreatment layer.

For coil coating, the layer thickness is typically 3.1 to 20 μm, preferably 4 to 15 μm, more preferably 4.5 to 10 μm, and with particular preference 5 to 8 μm.

In the case of atmospheric corrosion control the thickness of the layer after drying is typically 20 to 1000 μm, preferably 25 to 500 μm, more preferably 30 to 200 μm, and very preferably 35 to 150 μm.

The method of the invention allows a coating to be obtained, in particular a primer coating layer, on a metallic surface, in particular the surface of iron, steel, zinc, aluminum, magnesium, tin, copper or alloys thereof.

The metal may preferably be a metal sheet or metal coil, made in particular of zinc-coated steel, tin-coated steel, aluminized steel, aluminum or zinc-coated aluminum.

The present invention further provides a coated metallic surface obtainable from the method of the invention described above.

Atop the metallic surface with the primer coating layer it is possible for further coating layers to be applied. Priming is preferably followed by electrocoating. The metallic surface to be coated may also per se itself be the coating on another substrate.

This can be performed in the same coil coating plant, in which two or more application stations and, if appropriate, curing stations are arranged in series. Alternatively, following application and curing, the coated coil can be taken off again, and further layers applied in other plants. After the coated coils have been produced, the coils for coating can be wound and then processed further at another place; alternatively they can be processed further as they come directly from coil coating. For instance, they can be laminated with plastics or provided with removable protective sheets.

In case of applications in the automobile segment the application of the composition of the invention may under certain circumstances not in fact be followed by cathodic dip coating. If the integrated pretreatment layer is also intended to replace the cathodic electrocoat, somewhat thicker integrated pretreatment layers are advisable, with a thickness for example of 10 to 25 μm, preferably 12 to 25 μm.

Atop the metallic surface provided with a composition of the invention it is also possible for further coating films to be applied. The nature and number of the coating films required are determined by the skilled worker in accordance with the desired use of the coated metal or shaped metallic part. Further coating films may include, for example, films of color coating, clearcoating or functional coating materials. One example of a functional coating material is a soft coating material having a relatively high filler content. This coating material can be applied advantageously before the color coating and/or topcoating material, in order to protect the metal and the integrated pretreatment layer against mechanical damage, caused by stonechipping or scratching, for example.

The coils provided with the primer coating layer can also, however, first be reduced in size, without further coating, and processed further to shaped parts. Different shaped parts can also be assembled by welding. Examples of suitable shaping methods include pressing and deep drawing.

Moldings can comprise coated metal sheets, foils or coils and also the metal components obtained therefrom.

Such components may be in particular those which can be used for lining, facing or cladding. Examples comprise automobile bodies or parts thereof, truck bodies, frames for two-wheelers such as motorcycles or pedal cycles, or parts of such vehicles, such as fenders or fairings, casings for household appliances such as washing machines, dishwashers, tumble driers, gas and electric ovens, microwaves, freezers or refrigerators, casings for industrial apparatus or installations such as machines, switch cabinets, computer housings or the like, construction elements in architecture, such as wall parts, facing elements, ceiling elements, window profiles or door profiles or dividing walls, furniture made from metallic materials, such as metal cabinets, metal shelves, parts of furniture, or fittings. The metallic surface may also be that of hollow articles for storing liquids or other materials, such as cans, canisters or else tanks.

The resultant profile elements and shaped parts are scratch-resistant, stable to corrosion, stable to weathering, and stable to chemicals, and can be overcoated readily with any of a very wide variety of coating materials.

The primer coating material without conductive pigments can also be used as a substitute for cathodic electrocoat. In this application, layer thicknesses of approximately 10-15 μm are typically employed.

The present invention further provides for the use of the composition of the invention as a primer coating material, particularly for coil coating or in atmospheric corrosion control.

EXAMPLES

Metal substrates used are hot dip galvanized steel (HDG) and aluminum. HDG is available commercially from Chemetall (OEHDG/2), according to DIN EN 10142 and 01147). Aluminum was likewise obtained from Chemetall, and has the specification AA6016.

Coating systems used are three different primer coating materials ("primers"). They constitute an epoxy material based on an organic solvent, and two water-based acrylate and polyurethane materials.

The epoxy material comprises the following constituents:
44.25% Epoxy binder based on Bisphenol A
0.91% Epoxy binder B
8.25% Butyl glycol diluent
0.26% Filler: pyrogenic, hydrophilic silica (Aerosil® 200V)
4.78% Filler: talc
17.81% White pigment: $TiO_2$-rutile
4.95% Corrosion inhibitor pigment: Ca—$SiO_2$
6.76% Corrosion inhibitor pigment: zinc phosphate (ZP BS M)
1.65% Black pigment: Sicomix
9.73% 1 K crosslinker (blocked hexamethylene diisocyanate)
0.65% Catalyst Acrylate Dispersion The acrylate dispersion is anionically stabilized (ammonia) and comprises as monomers acrylic acid, methyl methacrylate, 4-hydroxystyrene, n-butyl acrylate, styrene, hydroxypropyl methacrylate, and ethyl methacrylate.

Polyurethane Dispersion (PU)

The PU dispersion comprises the oligomeric constituents 4,4'-bis(isocyanatocyclohexyl)methane (variety) ($M_n$=8000, $M_w$=21 000, SC=44%, AN=25) as isocyanate component and a polyester segment ($M_n$=2000, $M_w$=5500 g/mol), both chain-extended with triethanolamine.

Both binders (acrylate dispersion and polyurethane dispersion) are formulated in coating formulas similar to that of the epoxy binder.

Examples Relating to the Preparation of Polymeric Corrosion Inhibitors

The K values were measured by the method H. Fikentscher, Cellulose-Chemie, vol. 13, pp. 58-64 and 71-74 (1932) in 1% strength by weight solution at 25° C.

Example 1

A 6 l pressure reactor with anchor stirrer, temperature monitoring and nitrogen inlet is charged with 486.3 g of maleic anhydride and 22.5 mg of iron sulfate in one liter of deionized water. The initial charge is heated under nitrogen at 115 to 120° C. After it has reached this temperature, 1725 g of acrylic acid in 1.225 l of deionized water are added at a uniform rate over the course of 4 h and 115 g of 30% strength hydrogen peroxide solution and 257.5 ml of deionized water are metered in at a uniform rate over the course of 5 h. The batch is diluted with 191.3 g of deionized water and stirred at 120° C. for 2 h. This gives a clear yellow solution having a solids content of 44.7% and a K value (1% in deionized water) of 28.4. 1146 g of this solution are adjusted to a pH of 8.5 using N,N-dimethylethanolamine.

Example 2

A 6 l pressure reactor provided with anchor stirrer, temperature monitoring, nitrogen inlet and two feed points is charged with 486.3 g of maleic anhydride, 22.5 mg of iron(II) sulfate heptahydrate, and 1000 g of deionized water. The initial charge is heated under nitrogen at 115 to 120° C. After the initial charge has reached this temperature, feedstream 1, consisting of 1725.0 g of acrylic acid, 66.33 g of vinylphosphonic acid (3% by weight based on maleic anhydride and acrylic acid) and 1344.8 g of deionized water, is metered in at a uniform rate over the course of 5 hours, and feedstream 2, consisting of 115.0 g of hydrogen peroxide (30% strength) and 257.5 g of deionized water, is metered in at a uniform rate over the course of 6 hours. After the end of feedstream 1 a further 191.3 g of deionized water are added. The reaction mixture is stirred at 120° C. for 2 further hours. During the polymerization the pressure is maintained at 3 to 4 bar by careful release. After cooling, a yellowish, clear polymer solution is obtained which has a solids content of 45.2% and a K value (1% strength in deionized water) of 27.1. 850 g of this polymer solution are adjusted to a pH of 8.3 using N,N-dimethylethanolamine.

Example 3

In a stirring pot with blade stirrer and internal thermometer, 121.6 g of maleic anhydride are dissolved in 190 g of deionized water and the solution is stirred under gentle reflux and with nitrogen blanketing for one hour. 5.62 mg of iron(II) sulfate heptahydrate in solution in 10 g of deionized water are added all at once and the feedstream 1, consisting of 86.3 g of triethanolamine and 50.0 g of deionized water, is metered in over 5 minutes. Subsequently feedstream 2, consisting of 431.3 g of acrylic acid, 55.2 g of hydroxyethyl acrylate in 336.0 g of deionized water, is added in 4 h, and feedstream 3, consisting of 40.2 g of hydrogen peroxide (30% strength) and 112.0 g of deionized water, is added in 5 h. After the end of the addition the batch is stirred under reflux conditions for a further 2 h and cooled to room temperature. This gives a pale yellowish, clear polymer solution having a solids content of 32.3% and a K value (1% strength in deionized water) of 46.1. 250 g of this solution are adjusted to a pH of 8.3 using triethanolamine.

Example 4

In a stirring pot with blade stirrer and internal thermometer 99.9 g of itaconic acid are dissolved in 350 g of deionized water, 3.488 mg of iron(II) sulfate heptahydrate are added, and the solution is heated under gentle reflux (internal temperature 98° C.). Subsequently feedstream 1, consisting of 267.3 g of acrylic acid, 20.4 g of vinylphosphonic acid, and 812.0 g of deionized water, is added over the course of 5 h, and feedstream 2, consisting of 38.5 g of hydrogen peroxide in 350 g of water, is added over the course of 6 h. After the end of feedstream 1 the batch is stirred at 99° C. for a further 2 h. This gives a colorless, clear polymer solution having a solids content of 19.3% and a K value (1% strength in deionized water) of 37.8. 250 g of this polymer solution are adjusted to a pH of 8.5 using N,N-dimethylethanolamine.

Example 5

In a stirring pot with blade stirrer and internal thermometer 49 g of maleic anhydride in 250 g of Pluriol A1000E (monomethylpolyethylene glycol, Mw 1000 g/mol) are heated to 150° C. Subsequently feedstream 1, consisting of 144 g of acrylic acid, is added over the course of 5 h and feedstream 2, consisting of 3.9 g of di-tert-butyl peroxide in 20 g of Lutensol A7 N (nonionic surfactant from BASF AG), is added over the course of 5 h 30 min. After the end of feedstream 1 the batch is stirred at 150° C. for a further 2 h. This gives a yellow, highly viscous polymer. A portion was diluted with deionized water and adjusted to a pH of 8.5 using N,N-dimethylethanolamine (solids content 22.9%).

Example 6

In a stirring pot with blade stirrer and internal thermometer 74.9 g of itaconic acid and 57.7 g of Uniperol AC type SE are dissolved in 262.5 g of deionized water, 2.616 mg of iron(II) sulfate heptahydrate are added, and the solution is heated under gentle reflux (internal temperature 98° C.). Subsequently feedstream 1, consisting of 200.5 g of acrylic acid, 15.3 g of vinylphosphonic acid, 27.8 of hydroxyethyl acrylate and 609 g of deionized water, is added over the course of 5 h, and feedstream 2, consisting of 28.9 g of hydrogen peroxide in 608.9 g of water, is added over the course of 6 h. After the end of feedstream 1 the batch is stirred at 99° C. for a further 2 h. This gives a colorless, clear polymer solution having a solids content of 19.3%. 942 g of this polymer solution are adjusted to a pH of 8.2 using N,N-dimethylethanolamine.

Example 7

In a stirring pot with blade stirrer and internal thermometer 249 g of Pluriol A10R (allyl alcohol ethoxylate, commercial product from BASF AG) are heated to 150° C. under a nitrogen atmosphere. Subsequently feedstream 1, consisting of 36 g of acrylic acid and 52 g of styrene, is added over the course of 5 h and feedstream 2, consisting of 10.1 g of di-tert-butyl peroxide in 20 g of Lutensol A7 N (nonionic surfactant from BASF AG), is added over the course of 5 h. After the end of feedstream 1 the batch is stirred at 150° C. for a further 2 h. This gives a yellow, highly viscous polymer. It was diluted with 750 g of deionized water and adjusted to a pH of 9 using N,N-dimethylethanolamine (solids content 28.6%).

Example 8

In a 2 l pilot agitator with anchor stirrer and internal thermometer 121.6 g of maleic anhydride and 152 g of vinylphosphonic acid are dissolved in 190 g of deionized water, nitrogen is injected, and the solution is stirred at 99° C. for 1 h. Subsequently 703 mg of iron(II) sulfate heptahydrate in solution in 10 g of deionized water are added. Then feedstream 1, consisting of 51.7 g of dimethylethanolamine in 50 g of deionized water, is added over the course of 5 minutes and feedstream 2, consisting of 430 g of acrylic acid in 455 g of deionized water, is added over the course of 5 h, and additionally feedstream 3, consisting of 42.4 g of sodium peroxodisulfate in 160 g of water, is added over the course of 6 h. After the end of feedstream 3, stirring is continued at 99° C. for a further 2 h. This gives a yellow, clear polymer solution having a solids content of 47.1% and a K value (1% strength in deionized water) of 19.4. 400 g of this polymer solution are mixed with 40 g of deionized water and adjusted to a pH of 8.0 using 192 g of dimethylethanolamine. Solids content: 52.6%.

Example 9

In a stirring pot with blade stirrer and internal thermometer 249 g of Pluriol A10R (allyl alcohol ethoxylate, commercial product from BASF AG) are heated to 150° C. under a nitrogen atmosphere. Subsequently feedstream 1, consisting of 36 g of acrylic acid and 52 g of styrene, is added over the course of 5 h and feedstream 2, consisting of 10.1 g of di-tert-butyl peroxide in 20 g of Lutensol A7 N (nonionic surfactant from BASF AG), is added over the course of 5 h. After the end of feedstream 1 the batch is stirred at 150° C. for a further 2 h. This gives a yellow, highly viscous polymer. It was diluted with 200 g of butyl glycol (solids content 63.5%, K value (1% strength in butyl glycol) 28.8).

Example 10

Approximately 400 g of example 8 is freeze-dried prior to pH adjustment. The solid (201 g) is dissolved in 200 g of methanol. This gives a solution having a solids content of 49.7%.

Example 11

In a stirred tank with anchor stirrer, 7.161 kg of maleic anhydride are dissolved in 5 kg of deionized water, then 8.951 kg of vinylphosphonic acid in 12 kg of deionized water are added, nitrogen is injected, and the mixture is stirred at 99° C. for 1 h. Subsequently 41.40 g of iron(II) sulfate heptahydrate in solution in 740 g of deionized water are added over the course of 1 minute. Thereafter feedstream 1, consisting of 5.088 kg of triethanolamine and 5.0 kg of deionized water, is added over the course of 5 minutes. Subsequently feedstream 2, consisting of 25.322 kg of acrylic acid, is added over the course of 5 h and feedstream 4, consisting of 2.497 kg of sodium peroxodisulfate in 33.2 kg of deionized water, is added over the course of 6 h. After the end of feedstream 2, rinsing is carried out with feedstream 3, consisting of 5 kg of deionized water. After the end of feedstream 4 stirring is continued at 99° C. for a further 2 h. After cooling, a yellow, clear polymer solution is obtained which has a solids content of 46.4% and a K value (1% strength in deionized water) of 18.4.

Example 12

In a 2 l pilot agitator with anchor stirrer and internal thermometer 126.3 g of vinylphosphonic acid are dissolved in 200 g of isopropanol, nitrogen is injected, and the solution is heated with stirring at 65° C. Subsequently, at 65-73° C., feedstream 1, consisting of 120 g of vinyl acetate and 360 g of acrylic acid, is added over the course of 5 h and feedstream 2, consisting of 36.0 g of WAKO V-65 in 400 g of isopropanol, is added over the course of 6 h. After approximately 3.5 h the polymer solution is again diluted with 171 g of isopropanol. After the end of feedstream 2 it is stirred at 68-73° C. for a further 4 h. This gives a colorless, clear polymer solution having a solids content of 47.0% and a K value (1% strength in methanol) of 19.7.

Example 13

In a 2 l pilot agitator with anchor stirrer and internal thermometer 68.2 g of vinylphosphonic acid are dissolved in 471.2 g of dioxane, nitrogen is injected, and the solution is heated with stirring at 95° C. Subsequently, at 95° C., feedstream 1, consisting of 508.8 g of lauryl acrylate and 100.9 g of acrylic acid, is added over the course of 4 h and feedstream 2, consisting of 20.2 g of WAKO V-59 in 200 g of dioxane, is added over the course of 5 h. After the end of feedstream 2 it is stirred at 95° C. for a further 2 h. This gives a colorless, turbid polymer solution having a solids content of 51.0% and a K value (1% strength in tetrahydrofuran) of 17.6.

Example 14

In a 2 l pilot agitator with anchor stirrer and internal thermometer 127.9 g of vinylphosphonic acid are dissolved in 430 g of dioxane, nitrogen is injected, and the solution is heated with stirring at 95° C. Subsequently, at 95° C., feedstream 1, consisting of 318 g of lauryl acrylate and 189.2 g of acrylic acid, is added over the course of 4 h and feedstream 2, consisting of 18.9 g of WAKO V-59 in 200 g of dioxane, is added over the course of 5 h. During the polymerization the batch was diluted with a total of 220 g of deionized water and 135 g of dioxane. After the end of feedstream 2 it is stirred at 90° C. for a further 4 h. This gives a colorless, turbid polymer solution having a solids content of 40.3% and a K value (1% strength in methanol) of 19.3.

The HDG surfaces are cleaned in a three-stage process:

Solvent-based degreasing (ethanol/ethyl acetate), alkaline cleaning (Henkel Ridoline C72, bath was adjusted to a value of 4.2 in accordance with the Henkel protocol, 60° C., 60 sec.), followed by drying with compressed air. The same procedure was used for the aluminum surfaces.

The binder was admixed with 5% by weight of a polymeric corrosion control component B as indicated in the table below, applied in such a film thickness to the metal plate surface by means of a doctor blade, and cured in an oven at a peak metal temperature at 171° C. (oven temperature 181 to 183° C., 87 to 120 sec) that a film thickness after drying of 5 to 6 µm is obtained.

The plates thus coated were subjected to the following tests:

Corrosion Tests:

Salt spray test (SSC, DIN 50021) for hot dip galvanized steel (HDG)

Acetic acid salt spray test (AASS, ASTM B287) for aluminum

Climatic cycling test (CCT) (VDA test sheet 621-415 Feb. 82) for HDG:

The appearance of the surface was investigated for subsurface migration and for film delamination at the scribe site.

Results for CCT, SSC and AASS are compared qualitatively in comparison with a blank sample (comprising no polymeric corrosion control component B).

Key to the test method:
A=Test in acrylate-based primer
P=Test in PU-based primer
E=Test in epoxy-based primer
Abbreviations:

| | |
|---|---|
| AA | Acrylic acid |
| BG | Butyl glycol |
| DMEA | Dimethylethanolamine |
| HEA | Hydroxyethyl acrylate |
| IA | Itaconic acid |
| LA | Lauryl acrylate (mixture of $C_{12}$-$C_{14}$ alkanol esters) |
| MA | Maleic acid |
| S | Styrene |
| VAc | Vinyl acetate |
| VPA | Vinylphosphonic acid |

Polymers in aqueous solution for testing in acrylate- or PU-based primer

| Ex. | Monomers | Ratio (% by weight) | Base | pH | Primer | Corrosion test |
|---|---|---|---|---|---|---|
| 1 | AA/MA | 75/25 | DMEA | 8.5 | P | AASS better than 0 sample |
| 2 | AA/MA/VPA | 73/24/3 | DMEA | 8.3 | P | AASS better than 0 sample |
| 3 | AA/MS/HEA | 68/23/9 | DMEA | 8.3 | A | CCT better than 0 sample |
| | | | | | P | AASS better than 0 sample |
| 4 | AA/IA/VPA | 72/23/5 | DMEA | 8.5 | A | AASS better than 0 sample |
| 5 | AA/MA/Pluriol A1000E | 4/1/0.5 (mol %) | DMEA | 9 | A | AASS better than 0 sample |
| | | | | | P | SSC better than 0 sample |
| 6 | AA/IA/VPA/HEA/ Uniperol AC SE | 54/20/15/4/7 | DMEA | 8.2 | A | AASS better than 0 sample |
| 7 | AA/A/Pluriol A10R | 1/1/1 (mol %) | DMEA | 9 | A | AASS better than 0 sample |
| 8 | AA/MA/VPA | 60/20/20 | DMEA | 8 | P | SSC better than 0 sample |

Polymer solutions in organic solvents for testing in epoxy-based primer:

| Ex. | Monomers | Ratio (% by weight) | Solvent | Primer | Corrosion test |
|---|---|---|---|---|---|
| 9 | AA/A/Pluriol A10R | 1/1/1 (mol %) | BG | E | AASS better than 0 sample |
| 10 | AA/MA/VPA | 60/20/20 | MeOH | E | AASS better than 0 sample |
| 11 | AA/MA/VPA | 60/20/20 | MeOH | E | AASS and CCT better than 0-sample |
| 12 | AA/VPA/VAc | 60/20/20 | Isopropanol | E | AASS better than 0 sample |

-continued

| Ex. | Monomers | Ratio (% by weight) | Solvent | Primer | Corrosion test |
|---|---|---|---|---|---|
| 13 | AA/VPA/LA | 35/15/50 | Dioxane | E | AASS better than 0 sample |
| 14 | AA/VPA/LA | 52.5/22.5/25 (mol %) | Dioxane/ water | E | AASS better than 0 sample |

We claim:

1. A composition for coating a metallic surface, comprising:
   A 15% to 70% by weight, based on the total weight of the composition, of a binder component comprising a binder selected from the group consisting of polyacrylates or styrene/acrylate copolymers (A1), styrene/alkadiene copolymers (A2), polyurethanes (A3), and alkyd resins (A4);
   B 0.1% to 40% by weight, based on the total weight of the composition, of a corrosion control component comprising at least one corrosion inhibitor polymer obtained from the polymerization of
      B1 0.1% to 95% by weight, based on the total amount of the monomers used to form said at least one corrosion inhibitor polymer, of at least one ethylenically unsaturated monocarboxylic acid; and
      0.1% to 70% by weight, based on the total amount of the monomers used to form said corrosion inhibitor polymer, of at least one monomer selected from the group consisting of B2, B3, and mixtures thereof, wherein
      B2 is at least one ethylenically unsaturated dicarboxylic acid of formulae

(HOOC)R¹C=CR²(COOH)　　　(I),or

R¹R²C=C(—(CH₂)ₙ—COOH)(COOH)　　　(II), or of the corresponding dicarboxylic anhydrides, wherein R¹ and R² are, independently of one another, hydrogen or a straight-chain or branched, optionally substituted alkyl radical having up to 20 carbon atoms; and wherein, in the case of said at least one ethylenically unsaturated dicarboxylic acid of formula (I), R¹ and R² together define an optionally substituted alkylene radical having 3 to 20 carbon atoms; and wherein n is 1, 2, 3, 4, or 5; and
      B3 is at least one ethylenically unsaturated comonomer other than B1 and B2;
   C 5% to 84.9% by weight, based on the total weight of the composition, of a solvent component;
   D 0 to 30% by weight, based on the total weight of the composition, of a crosslinkable component;
   E 0 to 70% by weight, based on the total weight of the composition, of a component comprising a pigment, filler, or combination thereof;
   F optionally further components;
   wherein said composition has a pH of from 7 to 8.9.

2. The composition of claim 1, wherein:
   (1) R¹ and R² are, independently of one another, selected from the group consisting of H and CH₃;
   (2) B2 is maleic acid or its anhydride; and
   (3) B1 is acrylic acid or methacrylic acid.

3. The composition of claim 1, wherein B3 comprises phosphonic acid groups and/or phosphoric acid groups.

4. The composition of claim 1, wherein B3 is vinyl phosphonic acid.

5. The composition of claim 1, wherein said at least one corrosion inhibitor polymer is obtained from the polymerization of B1 and B2 or B1 and B3 or B1, B2, and B3.

6. The composition of claim 5, wherein said at least one corrosion inhibitor polymer is obtained from the polymerization of B1, B2, and B3.

7. The composition of claim 6, wherein B1 is acrylic acid, B2 is maleic acid, and B3 is vinylphosphonic acid.

8. The composition of claim 5, wherein said at least one corrosion inhibitor polymer is obtained from the polymerization of B1, B2, and B3, wherein B1 is present in an amount of from 30% to 70% by weight, B2 is present in an amount of from 0.5% to 65% by weight, and B3 is present in an amount of from 0.2% to 65% by weight.

9. The composition of claim 5, wherein said at least one corrosion inhibitor polymer is obtained from the polymerization of B1, B2, and B3, wherein B1 is present in an amount of from 30% to 70% by weight, B2 is present in an amount of from 10% to 65% by weight, and B3 is present in an amount of from 2% to 40% by weight.

10. The composition of claim 1, wherein E is present in an amount of from 5% to 60% by weight.

11. A process for preparing the composition of claim 1, comprising:
   a) contacting components A, B, and C and, optionally, D, E and F, and
   b) mixing said components.

12. The process of claim 11, wherein component A is a dispersion and component B is a solution or emulsion.

13. A primer comprising the composition of claim 1.

14. A coil coating comprising the primer of claim 13.

15. The primer of claim 13, wherein said primer controls atmospheric corrosion.

16. A method of coating a metallic surface, comprising:
   (a) applying to said metallic surface a layer of the composition of claim 1;
   (b) optionally crosslinking said layer; and
   (c) drying said layer.

17. The method of claim 16, wherein (a) is preceded by a pretreatment step.

18. The method of claim 16, wherein (a) is not preceded by a pretreatment step.

19. The method of claim 16, wherein, after (c), said layer has a thickness of at least 3.1 µm.

20. The method of claim 16, wherein said metallic surface comprises iron, steel, zinc, aluminum, magnesium, tin, copper, or an alloy thereof.

21. The method of claim 16, wherein said metallic surface is the surface of a metal sheet or a metal strip.

22. The method of claim 21, wherein said metal sheet or said metal strip is selected from the group consisting of zinc-plated steel, tin-plated steel, aluminum-plated steel, unplated aluminum, and zinc-plated aluminum.

23. The method of claim 16, wherein (a) is followed by application of an electrocoat.

24. A coated metallic surface obtained by the method of claim 16.

25. The coated metallic surface of claim 24, wherein said metallic surface is iron, steel, zinc, aluminum, magnesium, tin, copper, or an alloy thereof.

26. The coated metallic surface of claim 24, wherein, after (c), said layer has a thickness of at least 3.1 µm.

27. A shaped article comprising the coated metallic surface of claim 24, wherein said article is selected from the group consisting of parts of automobile bodies, parts of truck bodies, casings for household appliances, casings for industrial apparatus, construction elements in architecture, and furniture.

* * * * *